United States Patent
McCauley et al.

(10) Patent No.: US 9,452,358 B2
(45) Date of Patent: Sep. 27, 2016

(54) SYSTEM AND METHOD FOR PLAYING A MUSIC VIDEO GAME WITH A DRUM SYSTEM GAME CONTROLLER

(71) Applicant: Activision Publishing, Inc., Santa Monica, CA (US)

(72) Inventors: Jack J. McCauley, Danville, CA (US); Brian Bright, Woodland Hills, CA (US); John Devecka, Budd Lake, NJ (US); Jason VandenBerghe, San Mateo, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 14 days.

(21) Appl. No.: 14/316,590

(22) Filed: Jun. 26, 2014

(65) Prior Publication Data

US 2014/0309003 A1    Oct. 16, 2014

Related U.S. Application Data

(60) Continuation of application No. 13/616,870, filed on Sep. 14, 2012, now Pat. No. 8,777,747, which is a division of application No. 12/103,703, filed on Apr. 15, 2008, now Pat. No. 8,317,614.

(51) Int. Cl.
*A63F 9/24* (2006.01)
*A63F 13/00* (2014.01)
*A63F 13/245* (2014.01)
(Continued)

(52) U.S. Cl.
CPC ............. *A63F 13/245* (2014.09); *A63F 13/06* (2013.01); *A63F 13/42* (2014.09); *A63F 13/814* (2014.09); *G10H 1/0016* (2013.01); *G10H 1/32* (2013.01); *A63F 13/235* (2014.09); *A63F 2300/1025* (2013.01); *A63F 2300/1062* (2013.01); *A63F 2300/8047* (2013.01);
(Continued)

(58) Field of Classification Search
CPC .................. G10H 2250/365; A63F 2300/8047
See application file for complete search history.

(56) References Cited

U.S. PATENT DOCUMENTS 4,418,598 A    12/1983 Klynas
4,479,412 A    10/1984 Klynas
(Continued)

OTHER PUBLICATIONS

International Search Report on corresponding PCT application (PCT/US2009/040564) from International Searching Authority (KIPO) dated Jan. 8, 2010.
(Continued)

*Primary Examiner* — Steven J Hylinski
(74) *Attorney, Agent, or Firm* — Klein, O'Neill & Singh, LLP

(57) ABSTRACT

A system and method for playing a multi-player music video game with a drum system video game controller is provided. In one embodiment, the invention relates to a method for providing a drum solo with a music based multi-player video game. In another embodiment, the invention relates to a system for providing analog input from one or more drum sensors used in game play associated with a music based multi-player video game. In yet another embodiment, the invention relates to a method for preventing interference between the one or more drum sensors. In one embodiment, the invention relates to a method for mapping digital information indicative of input to a video game controller in a first form to information in a second form, the second form conforming to a protocol for inputs to a video game console executing a music based multi-player video game.

8 Claims, 22 Drawing Sheets

(51) Int. Cl.
*A63F 13/42* (2014.01)
*A63F 13/814* (2014.01)
*A63F 13/20* (2014.01)
*G10H 1/00* (2006.01)
*G10H 1/32* (2006.01)
*A63F 13/235* (2014.01)

(52) U.S. Cl.
CPC ............... *A63F 2300/8088* (2013.01); *G10H 2210/091* (2013.01); *G10H 2220/141* (2013.01); *G10H 2230/281* (2013.01)

(56) References Cited

U.S. PATENT DOCUMENTS

| | | | |
|---|---|---|---|
| 4,503,705 A | 3/1985 | Polchaninoff | |
| 4,669,349 A | 6/1987 | Hyakutake | |
| 4,677,890 A | 7/1987 | Yannes | |
| 4,744,279 A | 5/1988 | Livingston | |
| 4,781,097 A | 11/1988 | Uchiyama et al. | |
| 4,817,485 A | 4/1989 | Bozzio et al. | |
| 4,924,741 A | 5/1990 | Vollenweider | |
| 5,038,660 A | 8/1991 | Watanabe | |
| 5,140,889 A | 8/1992 | Segan et al. | |
| 5,223,655 A | 6/1993 | Watanabe et al. | |
| 5,262,585 A | 11/1993 | Greene et al. | |
| 5,430,245 A | 7/1995 | Rogers | |
| 5,434,350 A | 7/1995 | Haney et al. | |
| 5,438,529 A | 8/1995 | Rosenberg et al. | |
| 5,739,457 A | 4/1998 | Devecka | |
| 5,801,320 A | 9/1998 | Segan et al. | |
| 5,824,938 A | 10/1998 | Costello et al. | |
| 6,018,121 A | 1/2000 | Devecka | |
| 6,075,197 A | 6/2000 | Chan | |
| 6,268,557 B1 | 7/2001 | Devecka | |
| 6,274,800 B1 | 8/2001 | Gardner | |
| 6,284,959 B1 | 9/2001 | Nicolosi | |
| 6,342,665 B1 | 1/2002 | Okita et al. | |
| 6,346,667 B2 | 2/2002 | Ishii | |
| 6,369,313 B2 | 4/2002 | Devecka | |
| 6,482,087 B1 | 11/2002 | Egozy et al. | |
| 6,555,737 B2 | 4/2003 | Miyaki et al. | |
| 6,586,666 B2 | 7/2003 | Abe | |
| 6,639,140 B2 | 10/2003 | Mishima | |
| 6,645,067 B1 | 11/2003 | Okita et al. | |
| 6,835,887 B2 | 12/2004 | Devecka | |
| 6,897,368 B2 | 5/2005 | Georges | |
| 6,979,770 B2 | 12/2005 | Hampton, Jr. | |
| 6,982,376 B2 | 1/2006 | Wise | |
| 7,038,117 B2 | 5/2006 | Yoshino | |
| 7,038,123 B2 | 5/2006 | Ludwig | |
| 7,381,885 B2 | 6/2008 | Arimoto | |
| 7,618,322 B2 | 11/2009 | Shimizu et al. | |
| 7,625,284 B2 | 12/2009 | Kay et al. | |
| 7,656,284 B2 | 2/2010 | Dolcetta et al. | |
| 7,682,237 B2 | 3/2010 | Ueshima et al. | |
| 7,737,351 B2 | 6/2010 | Suzuki | |
| 7,758,427 B2 | 7/2010 | Egozy | |
| 7,799,984 B2 | 9/2010 | Salter | |
| 8,317,614 B2 | 11/2012 | McCauley et al. | |
| 8,444,486 B2 | 5/2013 | Kay et al. | |
| 2001/0008100 A1* | 7/2001 | Devecka | A63F 13/005 84/738 |
| 2002/0040633 A1 | 4/2002 | Miyaki et al. | |
| 2004/0089142 A1* | 5/2004 | Georges | G10H 1/0025 84/610 |
| 2005/0022655 A1 | 2/2005 | Wise | |
| 2005/0085297 A1 | 4/2005 | Onoda et al. | |
| 2005/0096132 A1 | 5/2005 | Ueshima et al. | |
| 2006/0107819 A1 | 5/2006 | Salter | |
| 2007/0232374 A1 | 10/2007 | Lopiccolo et al. | |
| 2007/0265104 A1 | 11/2007 | Haga et al. | |
| 2008/0053293 A1* | 3/2008 | Georges | G10H 1/0025 84/609 |
| 2008/0113797 A1 | 5/2008 | Egozy | |
| 2008/0163739 A1 | 7/2008 | Mori | |
| 2008/0220864 A1* | 9/2008 | Brosius | A63F 13/06 463/33 |
| 2008/0271591 A1 | 11/2008 | Lemons | |
| 2008/0311969 A1 | 12/2008 | Kay et al. | |
| 2009/0088249 A1 | 4/2009 | Kay et al. | |
| 2009/0258686 A1 | 10/2009 | McCauley et al. | |
| 2011/0218022 A1 | 9/2011 | Chiu et al. | |
| 2013/0012279 A1 | 1/2013 | McCauley et al. | |

OTHER PUBLICATIONS

"Midi Drum Machine Project", by Paul Stoffregen and Rody Seel, Fall 1991, last updated Feb. 24, 2005. Sourced from pjrc.com/tech/midi-drums/midi.html.

"Tutorial on MIDI and Music Synthesis", Copyright 2001 MIDI Manufacturers Associated Incorporated. Written by Jim Heckroth, Crystal Semiconductor Corp.

"Wii Wheel", Operations Manual, Nintendo of America, Inc., C/RVL-A-HA-USZ, 65142A, 2008.

"Wii", Wii Operations Manual, System Setup, Nintendo of America Inc. 61914D, 2007.

Written Opinion on corresponding PCT application (PCT/US2009/040564) from International Searching Authority (KIPO) dated Jan. 8, 2010.

\* cited by examiner

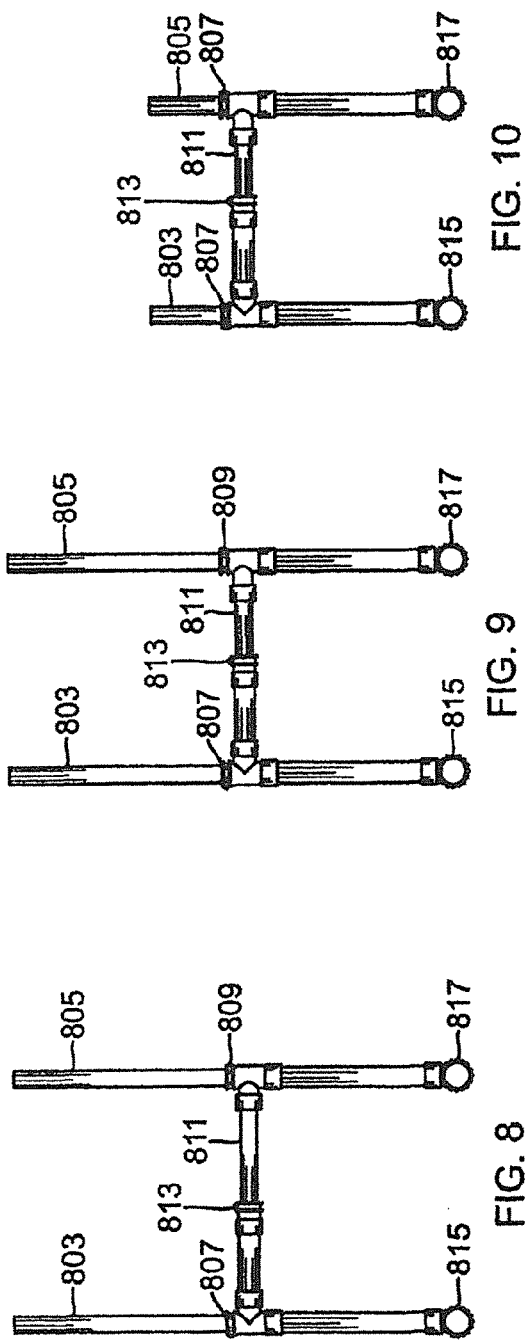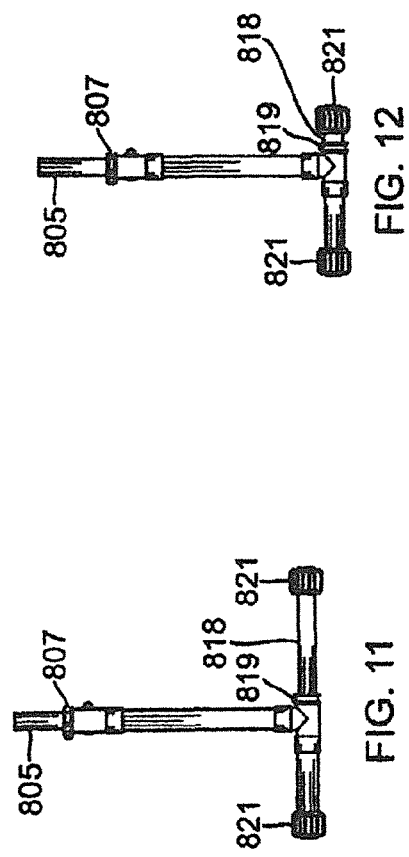

| MIDI Note Number | MIDI Velocity Number | X-Box Mapping | Wii Mapping | Playstation Mapping |
|---|---|---|---|---|
| Note 36 (Snare Drum) | 64 | Analog Stick 1 Positive X-Axis | Nunchuk Stick Positive X-Axis | Left Stick X-Axis |
| Note 36 (Kick Drum) | 0 | Analog Stick 1 Negative X-Axis | Nunchuk Stick Positive Y-Axis | Right Stick Y-Axis |
| Note 48 (High Tom) | 0 | Analog Stick 1 Negative Y-Axis | Nunchuk Stick Negative Y-Axis | X Button |
| Note 45 (Low Tom) | 0 | Analog Stick 2 Positive X-Axis | B Button | Δ Button |
| Note 46 (Hi-Hat) | 50 | Analog Stick 2 Positive Y-Axis | Z Button | O Button |
| Note 49 (Crash) | 0 | Right Trigger | Accelerometer Z Position | L1 Button |

FIG. 22

SYSTEM AND METHOD FOR PLAYING A MUSIC VIDEO GAME WITH A DRUM SYSTEM GAME CONTROLLER

CROSS-REFERENCE TO RELATED APPLICATION

The present application is a continuation of U.S. patent application Ser. No. 13/616,870, filed Sep. 14, 2012, which is a divisional of U.S. patent application Ser. No. 12/103,703, filed Apr. 15, 2008, now U.S. Pat. No. 8,317,614, the disclosures of which are incorporated by reference herein.

BACKGROUND OF THE INVENTION

The present invention relates generally to video games, and more particularly to a system and method for playing a music video game with a drum system video game controller.

Video games provide a source of entertainment for many people. More specifically, video games provide an interactive experience for a player, an experience that can be both interesting and challenging. Video games may provide players the opportunity to engage in activities otherwise unavailable to them, or activities which may, except through the simplification provided by video games, otherwise require extensive training or practice. Video games may also provide for increasing levels of difficulty, allowing for growth of player capabilities.

Music based multi-player video games utilizing simulated musical instruments are popular video games. Video game controllers used in such games may generally replicate the shape of a musical instrument, allowing players the opportunity to more fully enmesh themselves in a music creation experience. Furthermore, proficiency at playing simulated musical instruments in video game environments may be more easily achieved than becoming proficient at using real musical instruments. Therefore, in many instances, much of the joy associated with successfully playing a musical instrument may be experienced even if a player has not contributed years to practicing and mastering the craft.

SUMMARY OF THE INVENTION

The invention provides a system and method for playing a music video game with a drum system video game controller.

In one embodiment, the invention relates to a music based video game system including a plurality of drums forming part of a video game controller, the drums each including a sensor configured to detect a strike of a corresponding drum of the plurality of drums and to provide an analog signal indicative of the strike, an analog to digital converter (ADC) coupled to the sensors, the ADC configured to convert the analog signals into multi-bit digital signals, a game console configured to receive an input indicative of a song to play, command display of instructions for user operation of the video game controller, receive the multi-bit digital signals, and generate audio based on the multi-bit digital signals, the audio dependent on user compliance with the instructions for user operation.

In another embodiment, the invention relates to a drum game controller for use with a music based multi-player video game, the drum game controller including a first sensor configured to provide a first signal indicative of a strike of a first drum, the first signal having a first magnitude, a second sensor configured to provide a second signal indicative of a strike of a second drum, the second signal having a second magnitude, and processing circuitry coupled to the first drum sensor and the second drum sensor, the processing circuitry configured to ignore the second signal during a predetermined period of time after receiving the first signal.

In another aspect, the invention relates to a music based video game system including a foot pedal for use as part of a drum game controller, the system including at least one foot pedal including a base plate having a top surface and a bottom surface, a sensor assembly having a sensor for detecting pressure applied to the at least one foot pedal and for generating an analog signal indicative of the pressure, a pedal plate having a top surface for receiving the pressure and a bottom surface, a hinge coupled to the base plate and the pedal plate, and an actuating stop structure disposed on the bottom surface of the pedal plate, the stop structure for contacting the sensor assembly and for resisting the pressure applied via the pedal plate, and an analog to digital converter (ADC) coupled to the sensor, the ADC configured to convert the analog signal into a multi-bit digital signal, a game console configured to receive an input indicative of a song to play, command display of instructions for user operation of the drum game controller, receive the multi-bit digital signal, and generate audio based on the multi-bit digital signal and user compliance with the instructions for user operation.

In yet another aspect, the invention relates to a method for providing digital information indicative of operation of a video game controller simulating a drum set to a video game console executing a music based multi-player video game, the method including receiving analog signals from input devices of the video game controller simulating the drum set, converting the analog signals into an array of digital data, each element of the array containing one byte of data indicative of each analog signal, each one byte of data representing a MIDI velocity value, mapping each element of the array to a format conforming to a protocol for inputs to the video game console, and providing the mapped data to the video game console.

In still yet another aspect, the invention relates to a drum system for mapping digital information indicative of input to a video game controller in a first form to information in a second form, the second form conforming to a protocol for inputs to a video game console executing a music based multi-player video game, the system including at least one drum including a sensor configured to detect a strike of the at least one drum and to provide an analog signal indicative of the strike, processing circuitry configured to convert the analog signal indicative of the strike into a multi-bit digital signal, store the digital signal in a memory, convert the digital signal into a signal conforming to the protocol for inputs to the video game console, and output the analog signal conforming to the protocol for inputs to the video game console via a console interface.

In another aspect, the invention relates to a drum game controller having a collapsible support structure, the drum system used with a music based multi-player video game, the drum game controller including at least one drum including a sensor configured to detect a strike of the at least one drum and to provide a signal indicative of the strike, a collapsible support structure including a plurality of telescoping rods configured to be extended or retracted, a plurality of release mechanisms configured to retain or release the telescoping rods, and at least one drum platform supported, at least in part, by the telescoping rods, the at least one drum platform configured to support the at least one drum, and wherein the plurality of telescoping rods comprises two vertical telescoping rods configured to couple with the at least one drum platform, a horizontal telescoping rod, and two base telescoping rods, and each of the plurality of telescoping rods is configured to be retained or released using one of the plurality of release mechanisms.

In yet another aspect, the invention relates to a method for providing a drum solo mode with a music based multi-player video game, the method including suggesting at least one song having a drum solo portion, displaying, on a display, images indicative of a venue including at least one drum and a drummer, displaying, on the display, instructions for playing the at least one song on a game controller, generating audio indicative of the song at a first volume, at approximately a time when the drum solo portion is to be played, changing the images indicative of the venue, generating audio indicative of the song at a second volume, where the second volume is lower than the first volume, generating audio indicative of a crowd cheering, and displaying images indicative of the crowd cheering, receiving information indicative of drum play, determining, based on the information indicative of drum play, a score, and displaying the score.

These and other aspects of the invention are more fully comprehended upon review of the disclosure.

BRIEF DESCRIPTION OF THE DRAWINGS

FIG. 8 is a front view of a collapsible drum support structure in an extended configuration in accordance with aspects of the invention;

FIG. 9 is a front view of the collapsible drum support structure of FIG. 8 having a horizontal telescoping rod in a retracted position in accordance with aspects of the invention;

FIG. 10 is a front view of the collapsible drum support structure of FIG. 8 having both vertical and horizontal telescoping rods in retracted positions in accordance with aspects of the invention;

FIG. 11 is a side view of the collapsible drum support structure of FIG. 10 illustrating a base telescoping rod in an extended position in accordance with aspects of the invention;

FIG. 12 is a side view of the collapsible drum support structure of FIG. 11 illustrating the base telescoping rod in a retracted position in accordance with aspects of the invention;

FIG. 22 is a table illustrating an example of MIDI data mapped to a message packet format suitable for control channels of different video game systems in accordance with aspects of the invention;

DETAILED DESCRIPTION

Figure 1:
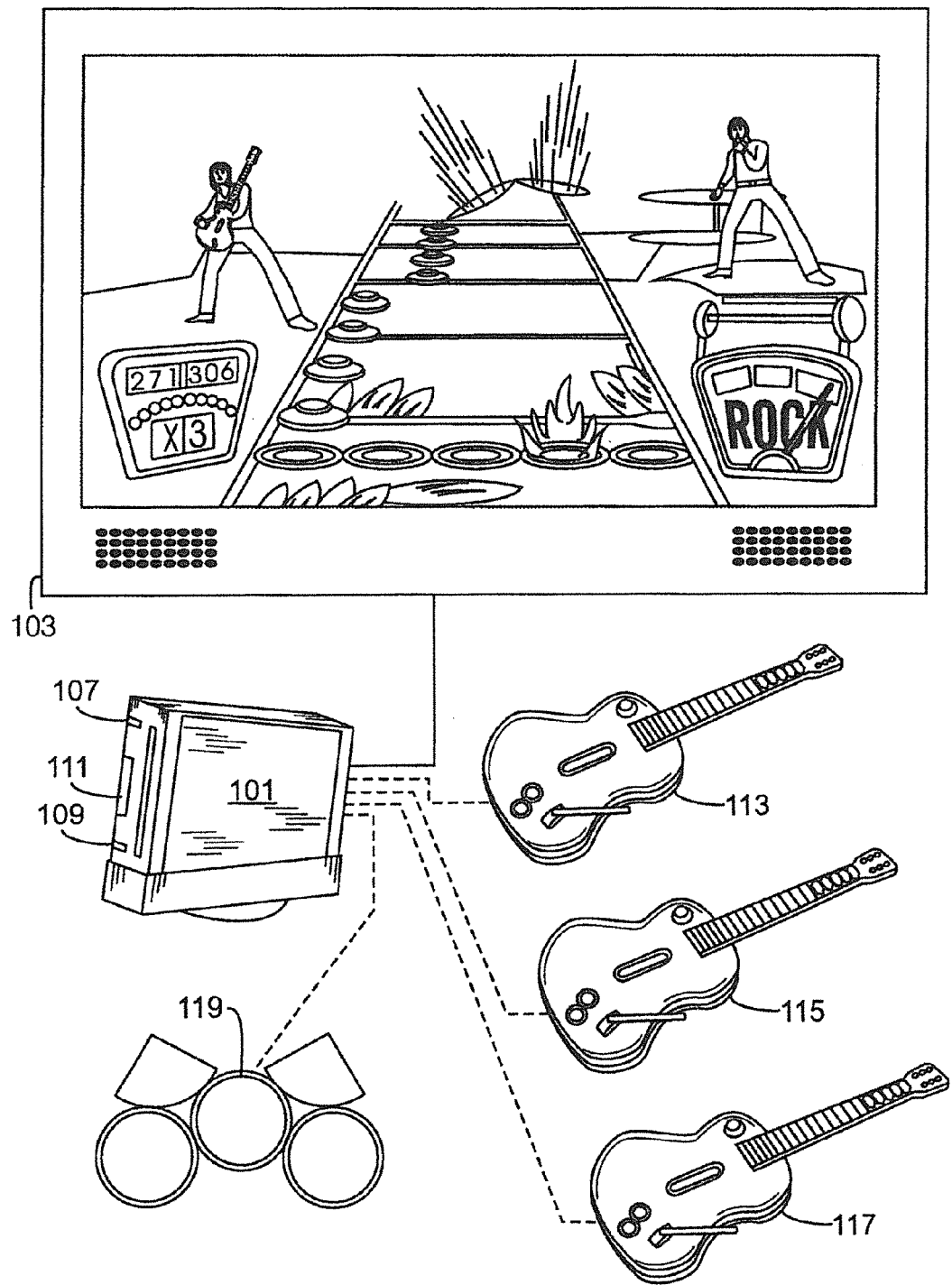
FIG. 1 is an example of a video game system including a drum system game controller in accordance with aspects of the invention.

FIG. 1 is an example of a video game system including a drum system game controller in accordance with aspects of the invention. The video game system includes a video game console 101, a display 103, and a variety of video game controllers (113, 115, 117, and 119). The video game console includes internal circuitry for performing video game related functions, with the circuitry generally including one or more processors, memory, and interface circuitry in some embodiments. In the embodiment illustrated in FIG. 1, the video game console 101 includes a memory interface 111. The memory interface is configured to communicate with an external memory source containing video game instructions, for example, a video game CD-ROM. In most embodiments the video game instructions are for a music/rhythm video game, and the video game console, or a processor, which may be part of a video game console, processes the instructions to provide for music/rhythm video game play.

The video game console receives signals from a drum system game controller 119. In FIG. 1 the video game console also receives signals from a first guitar shaped video game controller 113, a second guitar shaped video game controller 115, and a third guitar video game controller 117. In some embodiments all or some of the guitar video game controllers are not included, and in some embodiments other video game input devices, for example a microphone, DJ simulator, or a keyboard input device, may also be used. In other embodiments, any combination of guitar shaped video game controllers and drum system game controllers, or alternatively, other compatible instrument shaped video game controllers, may be used in conjunction with the music/rhythm video game. The different video game controllers may transmit signals to or receive signals from the video game console via wired connections, or through wireless communication, as is the case in FIG. 1.

The video game console is coupled to the display via an audio/video cable. As illustrated in FIG. 1, the display is a television with a display screen and audio speakers. The display screen shows a screenshot of a scrolling sheet of user instruction symbols for a music/rhythm video game. As illustrated, the scrolling sheet provides instructions for, for example, playing the drums, although in some embodiments instructions are displayed for each of a plurality of video game controllers. The screenshot also shows a score and a performance or "ROCK" meter. In one embodiment, the rock meter can be thought of as displaying a current amount of energy remaining for the game player.

In the music/rhythm video game embodiment of FIG. 1, the video game console processes a sequence of inputs from each video game controller. The video game console can assign a simulated audio output for each input, thereby generating an audio feature comprised of a sequence of audio outputs, for example, an audio track for a single instrument in the context of a song. A user operating a video game controller may control the generation of the audio feature by pressing or otherwise manipulating inputs on the video game controller. In a number of embodiments, the video game console uses input received from the user only to raise or lower a volume of a currently playing song or track, or a volume of a particular musical instrument used in the currently playing song or track.

Figure 2:
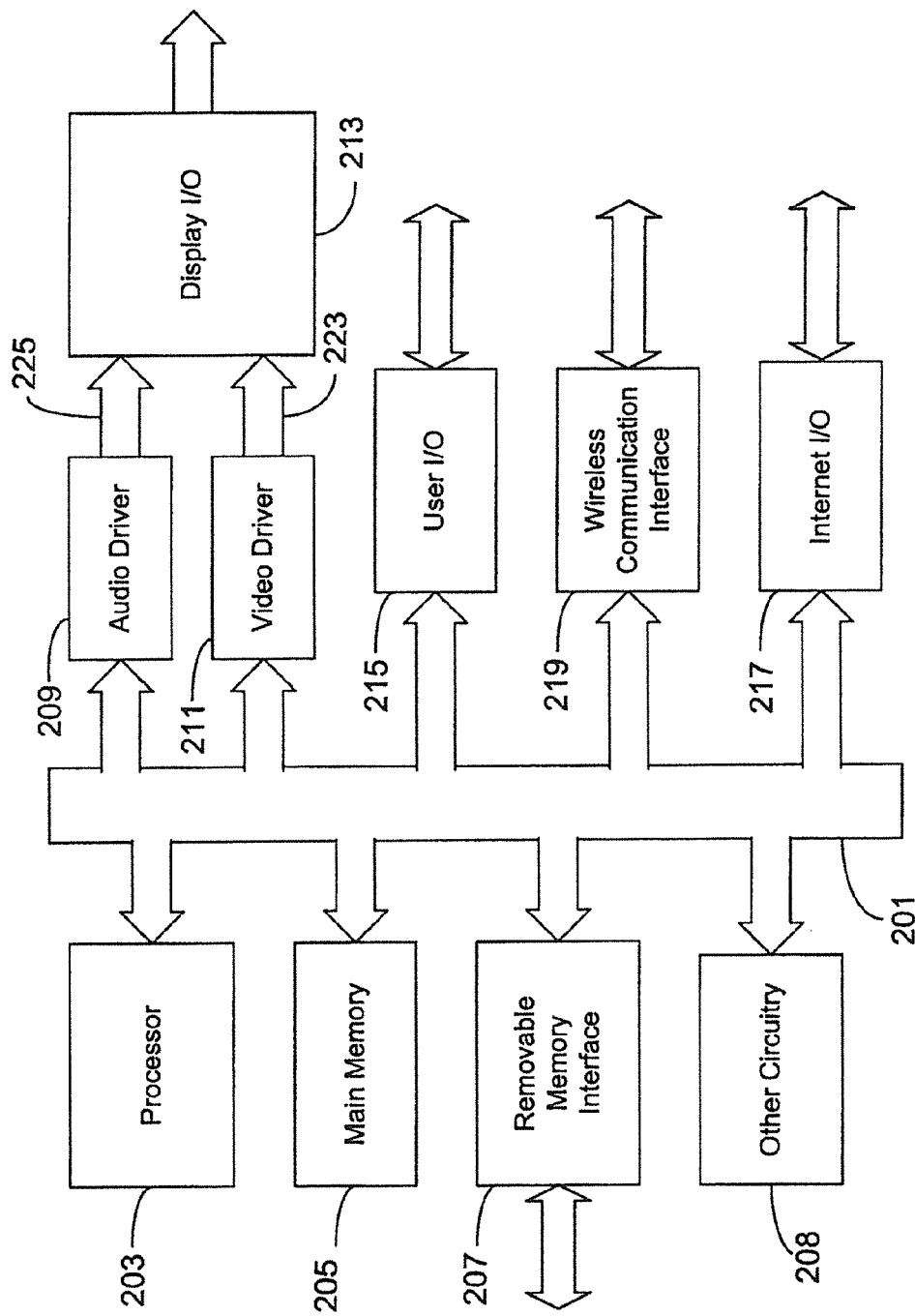
FIG. 2 is an example of a block diagram of a video game console processing unit in accordance with aspects of the invention.

FIG. 2 is an example block diagram of a video game console processing unit in accordance with aspects of the invention. The processing unit includes a bus 201 coupling a processor 203, a main memory 205, a memory interface 207, other circuitry 208, an audio driver 209, a video driver 211, a user input/output port 215, an internet input/output port 217, and a wireless communication interface 219. In other embodiments, additional components can be coupled to the bus or some of the illustrated components can be removed. The audio driver 209 and the video driver 211 are coupled to a display input/output port 213.

In FIG. 2, the processor communicates with each individual component via the bus to execute software instructions in conjunction with video game play. In operation, the processor retrieves specific video game instructions from an external memory source inserted into the memory interface, such as a video game CD-ROM. The processor executes the video game instructions in accordance with additional program instructions stored in the main memory. The main memory may also be used to store data generated in association with the execution of the video game, which may originate from the processor or other devices connected to the bus. Instructions associated with video game execution may include game play instructions, configuration information, information relating to video and audio outputs, and instructions for processing user inputs received from video game controllers.

As seen in FIG. 1, the processor is in data communication with a plurality of video game controllers. The video game controllers provide additional inputs to the processing unit, which executes video game play based in part on the video game controller inputs. The video game controllers communicate with the processor through wired user input/output ports located on the video game console, or alternatively, with the via the wireless communication interface.

The processor is also in data communication with a display unit, which displays video game action based on video game instructions executed by the processor. The processor sends audio information associated with video game play to the audio driver, and video information associated with video game play to the video driver. The audio driver generates audio signals using the audio information, and the video driver likewise generates video signals using the video information. The audio and video signals are sent to a display input/output port to be transmitted to the display unit for video and audio generation. In the embodiment illustrated in FIG. 2, the video driver and audio driver are coupled to the display input/output port via two dedicated bidirectional buses 223 and 225. In various other embodiments, separate audio and video input/output ports may be used instead of a combined display input/output port.

The processor may also be connected to the Internet via an internet input/output port. Connection to the Internet may be used to facilitate multiplayer game play with other users in remote locations. In the context of the invention, an Internet connection may also be used to upload audio features created by users to a remote server for other users to access and retrieve. In some embodiments, a wireless communication interface may be used to connect the video game console to the Internet in lieu of a hard wired internet input/output port. In some embodiments, the wired or wireless drum system is programmed to communicate with other devices such as a personal computer with MIDI capability.

Figure 3:
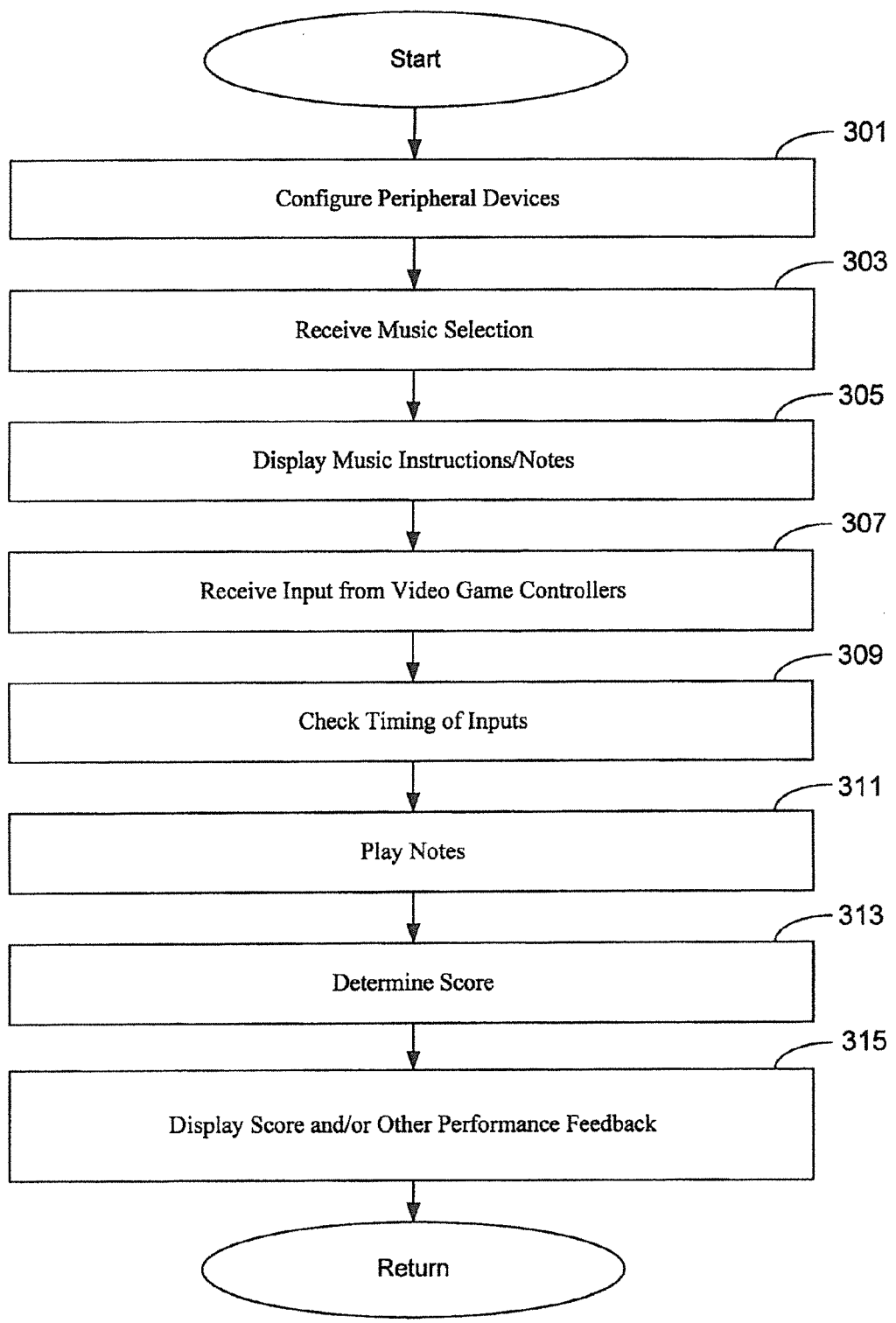
FIG. 3 is a flow diagram of a process for operating a video game console in accordance with aspects of the invention.

FIG. 3 is a flow diagram of a process for operating a video game console in accordance with aspects of the invention. In block 301, the process configures peripheral devices such as game controllers and display units coupled to the game console. In block 303, the process receives a music selection from the user. In several embodiments, the process presents the user with a selection of different songs that can be played by the user. In block 305, the process displays instructions for playing the music or specific notes of the music. In a number of embodiments, the instructions include color coded discs or other indicators on a scrolling screen (see FIG. 1) where the discs represent notes of the song and the colors correspond to specific inputs of a game controller (e.g., a drum pad or a fret button). In several embodiments, the instructions or user instruction symbols include information regarding how hard a particular instrument, such as a drum, is to be struck. In one such embodiment, the user instruction symbol includes an arrow, or another symbol, indicating a degree of force expected to be applied by a game player. In some embodiments, special instruction symbols are displayed. In one embodiment, for example, the symbol is a long wide channel called a roll. In such case, a user can strike the indicated drum any number of times during the roll and accumulate points for each strike. In another embodiment, a special instruction symbol indicates that the user is to hit the same pad nearly simultaneously.

In block 307, the process receives input from video game controllers. In several embodiments, the process receives input from a guitar shaped game controller or a drum system game controller. In several embodiments, the process displays images indicative of a live music venue on a display. In one such embodiment, the process displays a set of drums, a drummer, a guitar player with a guitar and a singer, a stage, and a crowd. In some embodiments, the input received from the video game controllers is indicative of MIDI data. In one such embodiment, the process modifies the displayed images indicative of the venue based on the MIDI data. For example, the process can modify the appearance of the band characters, the crowd and/or the lights.

In block 309, the process checks the timing of the inputs with respect to the instructions displayed on the display. In one embodiment, the process compares the timing of the displayed instruction with the input received from the game controllers to determine whether the proper input was actuated and, if so, whether the input was actuated at the right time. In block 311, the process plays the note indicated by the received input from the game controller(s). In some embodiments, if the wrong input is actuated or if it was actuated at the wrong time, then the process outputs a note or sound that indicates to the user that an incorrect note was played. In a number of embodiments, the process only raises or lowers a volume of the selected song, or a volume of a particular musical component of the song, in response to input received from the game controller(s). In one embodiment, the process outputs one of three possible sounds, or visual indicators, for a particular note based on the timing of the user's response to the displayed instruction. For example, each note can have a good, okay, and bad version of the note, where each version provides or generates a different sound and quality of note. In one embodiment, the process displays a small, medium or large flame on the display based on the accuracy of the user in playing the note.

In block 313, the process determines a score based on whether the proper input was actuated and, if so, also based on the timing of the proper input actuation. In block 315, the process displays the score and/or other performance feedback. In some embodiments, the process outputs feedback in the form of crowd response to user action. In such case, where the user has played according to instruction, the crowd feedback can be positive and, for example, in the form of applause. On the other hand, where the user has not played according to instruction, the crowd feedback can negative and, for example, in the form of silence, talking or booing.

In one embodiment, the process can perform the illustrated actions in any order. In another embodiment, the process can omit one or more of the actions. In some embodiments, the process performs additional actions in conjunction with the process. In other embodiments, one of more of the actions are performed simultaneously.

A number of different playing opportunities are presented to a user of a video game system having a drum system. One opportunity that is popular for accomplished musicians is the opportunity to play a drum solo. In several embodiments, the user enters a mode to play a drum solo by entering a particular entry note or sequence of entry notes. Similarly, the user can exit the drum solo mode by entering an exit note or sequence of exit notes. In one embodiment, the user returns to the song playing before the drum solo. In another embodiment, the user is returned to a user menu. In some circumstances, the drum solo can be performed in sort of a free form way, where the drummer follows no particular song but rather creates the drummer's own rhythms, beats and fills for some length of time. In such case, a number of different methods of scoring can be used for the solo mode. In other circumstances, the drummer performs the drum solo as part of a song performed with other players, or with just the game player and a virtual band providing specific background music for the drum solo. In some cases, guitar controllers can switch to percussion sounds or other sound samples to help the drummer play a solo.

In one embodiment, live drums are provided to the user while the video game system provides a drum solo pattern via a visual indicator or scrolling notes. In a number of embodiments, a user can solo with a simulated drummer generated by the video game system. In one such embodiment, the user controlled drummer and the game generated drummer compete with each other in a duel. In another such embodiment, the user controlled drummer and the game generated drummer play in a complimentary way. Similarly, in a number of embodiments, two game players can play either competitively or cooperatively. In accordance with several embodiments of the invention, the drum system and video game console can enable a video game user to execute various types of drum solos using suggested drum solo visual indicators in combination with live drum sounds. In a number of embodiments, the opportunity to play the drum solo occurs during an encore portion of a song.

Figure 4:
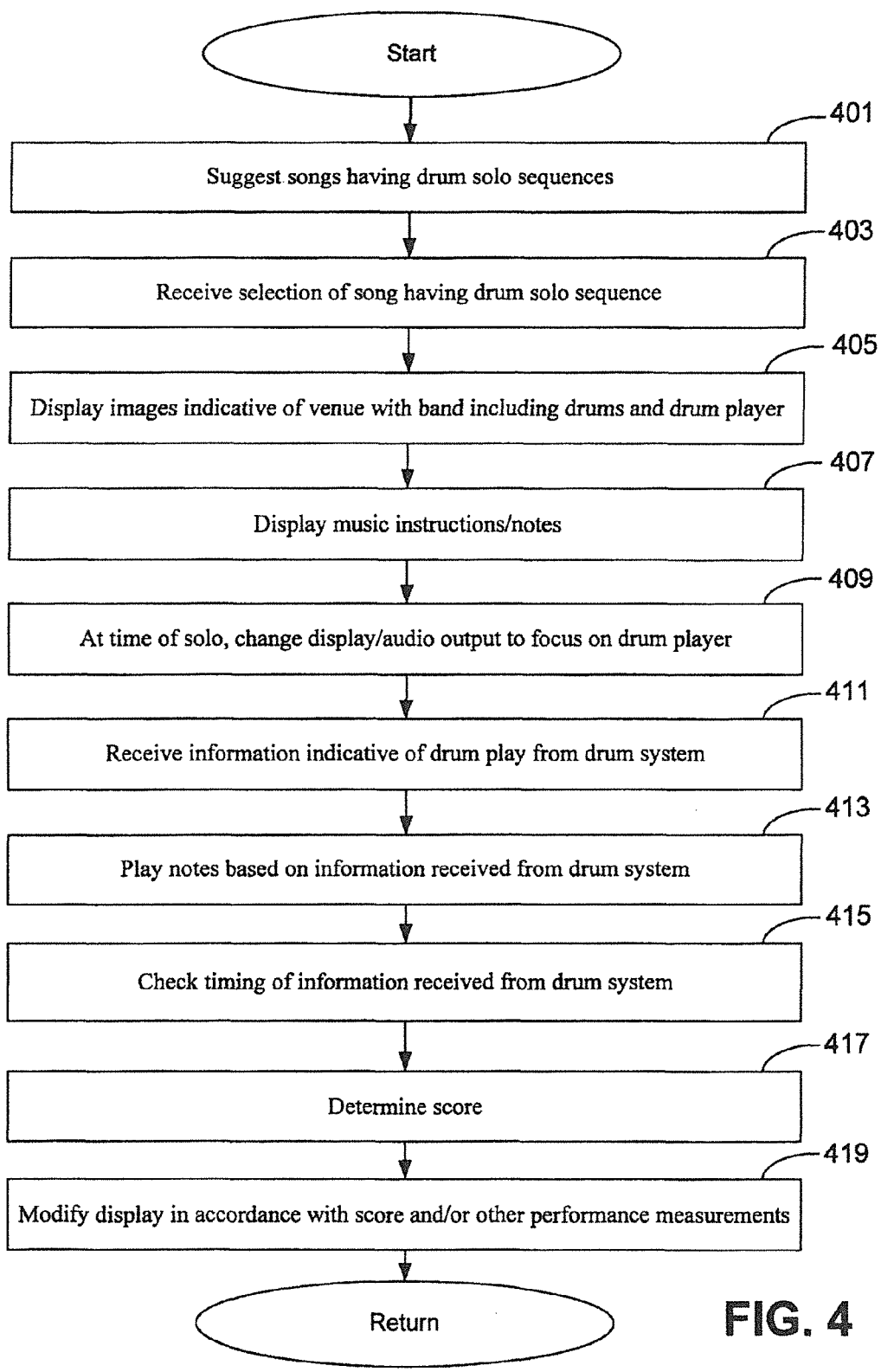
FIG. 4 is a flow diagram of a process for operating a video game console in conjunction with a drum solo in accordance with aspects of the invention.

FIG. 4 is a flow diagram of a process for operating a video game console in conjunction with a drum solo that can be performed during a song in accordance with aspects of the invention. In block 401, the process suggests or displays songs having drum solo sequences. In block 403, the process receives the selection of a song having a drum solo sequence. In block 405, the process displays images indicative of a venue with a band including a drum set and a drum player. In block 407, the process displays music instructions indicating which drum inputs to strike on a display. In one embodiment, the user is not really triggering the generated sounds. For example, in a number of embodiments, the process only raises or lowers a volume of the selected song, or a volume of a particular musical component of the song, in response to input received from the user. In another embodiment, the process generates sound based on any strikes of a drum by the user (e.g., live drums are available). In several embodiments, the drummer is expected to comply with the instructions provided by the drum solo indicators and is scored based on the extent of compliance. In other embodiments, the note indicators are only suggested drum solo note indicators and no score is generated.

In block 409, the process changes the display and/or audio output to focus on the drum player when it is time for the drum player to perform a drum solo in the selected song. In one embodiment, the process transforms the drum audio to provide the user with live drum sounds which can be modified and enhanced to assist beginner players in a number of ways, such as, by combining a bass drum sound with cymbal crash sounds, providing supporting rhythms, or providing the ability to change the drum sounds while playing live. In some embodiments, the process enables the user to switch to a percussion sound bank or have unusual sound samples like instruments sounds, sound effects, vocals and the like compared to a previous section which can include muting drum tracks when a timing error is made.

Alternative embodiments to signal a drum solo include the process momentarily pausing the current song, dimming stage lights on the display, causing a displayed crowd to cheer, focusing the camera or the focal point of the display on the drummer, focusing the lights on the drummer, and having the simulated members of the band, other than the drummer, walk off the stage (e.g., exit the screen). In such embodiments, after signaling the solo, the drummer can begin the solo. After an allotted time for the solo expires, the process returns to the background music of the selected song and the regular drum track. In one embodiment, the process returns any band members having left the stage area to the stage. In another embodiment, striking both cymbals on the drum system during the solo triggers a special scoring mode enabling a potential scoring bonus (e.g., a special score multiplier is applied to a user score). In one embodiment, the special scoring mode can be considered a star power mode where the user has the opportunity to earn more points during the mode which has a time limiting factor. In other embodiments, free form vocals, guitar play, or audio from other musical instruments can be added during the drum solo. In one such case, if the free form vocals properly track the beat and are on key, additional points can be added to a user score. Any number of different scoring algorithms can be used to generate a user score.

In block 411, the process receives information indicative of drum play from the drum system. In several embodiments, the information is in the form of data conforming to the musical instrument digital interface (MIDI) standard. The MIDI standard, which is known more specifically as "The Complete MIDI 1.0 Detailed Specification, document version 96.1" and is available from the MIDI Manufacturers Association of Los Angeles, Calif., is incorporated by reference herein in its entirety. In some embodiments, the MIDI standard can also refer to an extension of the MIDI standard known as "General MIDI". In block 413, the process plays notes based on the information received from the drum system. In some embodiments, the process plays the notes based on the digital instructions contained within any number of message packets including MIDI information received from the drum system.

In block 415, the process checks the received information to determine whether the proper drum instruction was played on the proper drum and whether the instruction was played within an acceptable time range. In block 417, the process determines a score based on the checks performed in block 415. In block 419, the process modifies the display in accordance with the score and/or other performance measurements. In one embodiment, the process displays the score. In another embodiment, the process changes the crowd response based on the user's performance. In some embodiments, the process changes the crowd response based on the user's ability to manipulate the physical actions of the simulated drummer on the display. For example, the user may get better crowd response and additional points by entering a sequence of moves or drumming strikes that results in the simulated drummer on the display tossing the drum sticks and catching them or other specialized drummer maneuvers.

In one embodiment, the process provides instructions for use in a drum solo mode but the compliance with those instructions does not cause the process to generate audio output. In one embodiment, the process provides a blended audio transition from a song to a solo section and then back into the original song. In some embodiments, the process provides live drum sample sounds to the user for a predetermined period of time. In a number of embodiments, the process enables the user to configure the generation of sounds in conjunction with a strike of a drum. In one embodiment, the process provides various enhanced drum sounds for drum solos executed on a based on a user skill level. In one such case, for example, one strike can result in multiple sounds being generated. In various embodiments, the process provides drum solo lead notes and mutable drum track audio based on the player level.

In another embodiment, the process provides a bonus algorithm associated with compliance with certain criteria. In one embodiment, other players are required to play supporting music not associated with the original song whereby their performance affects the scoring, the drummer's performance, in game instrument effects, such as, for example, levitating the drum set(s) and crowd reaction. In some embodiments, the process generates a process controlled simulated drummer/avatar plays drum solos and requires the user to play the same sections increasing in difficulty, like a drumming battle. In another embodiment, the avatar and user play in a complimentary manner (e.g., a celebrity drummer plays with you). In some embodiments, a celebrity drummer provides instruction to the game player. In some embodiments, other players are allocated solo performances which affect the scoring and crowd reaction. In one embodiment, the process enables the other players to play mutable continuous solo tracks with visual indicators. In some embodiments, the process enables other players to play live samples with or without visual indictors that do not control the audio output.

In one embodiment, the process can perform the illustrated actions in any order. In another embodiment, the process can omit one or more of the actions. In some embodiments, the process performs additional actions in conjunction with the process. In other embodiments, one of more of the actions are performed simultaneously.

Figure 5:
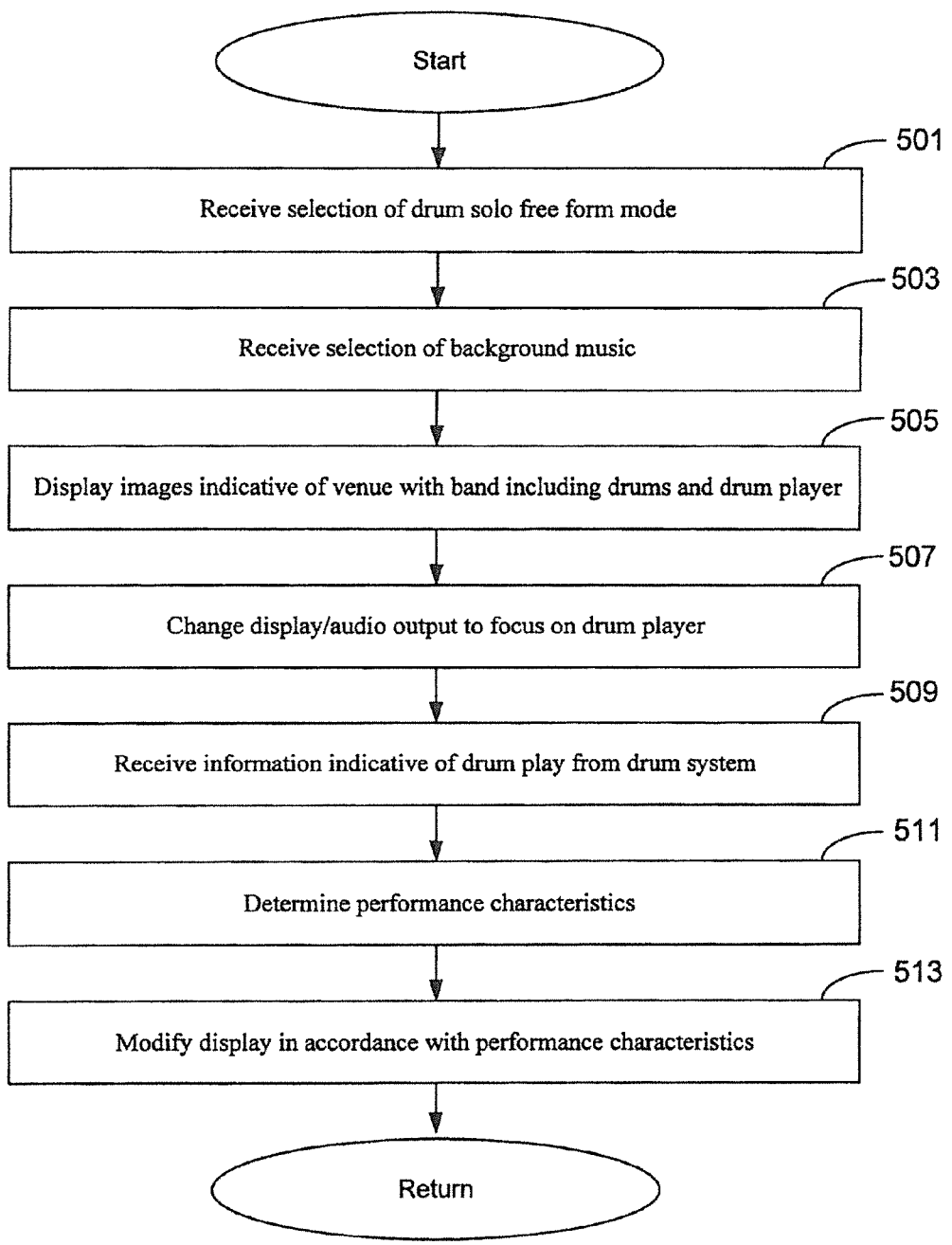
FIG. 5 is a flow diagram of a process for operating a video game console in conjunction with a free form drum solo in accordance with aspects of the invention.

FIG. 5 is a flow diagram of a process for operating a video game console in conjunction with a free form drum solo in accordance with aspects of the invention. In block 501, the process receives input indicative of the selection of a free form drum solo. In one embodiment, the user is prompted with a menu for selection of the free form mode. In other embodiments, the user enters a specialized sequence of drum strikes to enter the mode. In one such case the sequence must be entered during a song and the user does not necessarily then get to select the background music. In block 503, the process receives input indicative of the selection of background music for the drum solo. In some embodiments, the user chooses not to have background music and thus selects no background music. In one embodiment, the process does not generate the background music. In some cases, the background music option is predetermined by the system and player level.

In block 505, the process displays images indicative of a venue with a band, a drum set and a drum player. In several embodiments, the venue also includes a crowd, a stage, and other things common to a live music performance such as, for example, a rock concert. In block 507, the process changes the display and audio output to focus on the drum player. In several embodiments, the changes include momentarily pausing the current song, dimming stage lights on the display, causing a displayed crowd to cheer, focusing the camera or the focal point of the display on the drummer, and focusing the lights on the drummer. In such embodiments, after signaling the solo, the drummer can begin the solo. After an allotted time for the solo expires, the process returns to the background music of the selected song and the regular drum track.

In one embodiment, the process outputs audio in the form of a click track to assist the user during the free form drum solo. In such case, the click track can be any number of sounds that assist the user in keeping a tempo. The established click track or tempo guide can also help transition the player back into the tempo of the song that will appear at the end of the solo. For example, the click track can be steady crowd clapping, a clapping background drum, or a repetitive kick drum with cymbal crashes in the background. In some embodiments, the process only outputs the click track when the process determines that the user is substantially off tempo. In some embodiments, free form vocals can be added during the drum solo. In such case, if the vocals properly track the beat and are on key, additional points can be added to a user score. In one embodiment, the process provides a special bass/guitar jam song whereby a user must play supporting music on the bass/guitar controller that the drummer can solo over. In such case, the process can allow all members to solo at selected times, and thus to highlight the soloing skills of the entire band. In such cases, the guitar controllers could be triggering live music samples or playing solos within the standard game play mode.

In block 509, the process receives information indicative of drum play from the drum system game controller. In block 511, the process determines performance characteristics based on the information received from the drum system. In block 513, the process modifies the display and/or audio output based on the determined performance characteristics. In one embodiment, for example, the process provides positive crowd response when the user keeps a particular tempo or executes various drumming tricks. In some embodiments, certain drum solo performance bonuses generate special effects such displaying the virtual drum elevating, spinning and/or levitating, sparking drum sticks, exploding cymbals or syncopated drum pyrotechnics.

In one embodiment, the process can perform the illustrated actions in any order. In another embodiment, the process can omit one or more of the actions. In some embodiments, the process performs additional actions in conjunction with the process. In other embodiments, one or more of the actions are performed simultaneously.

Figure 6:
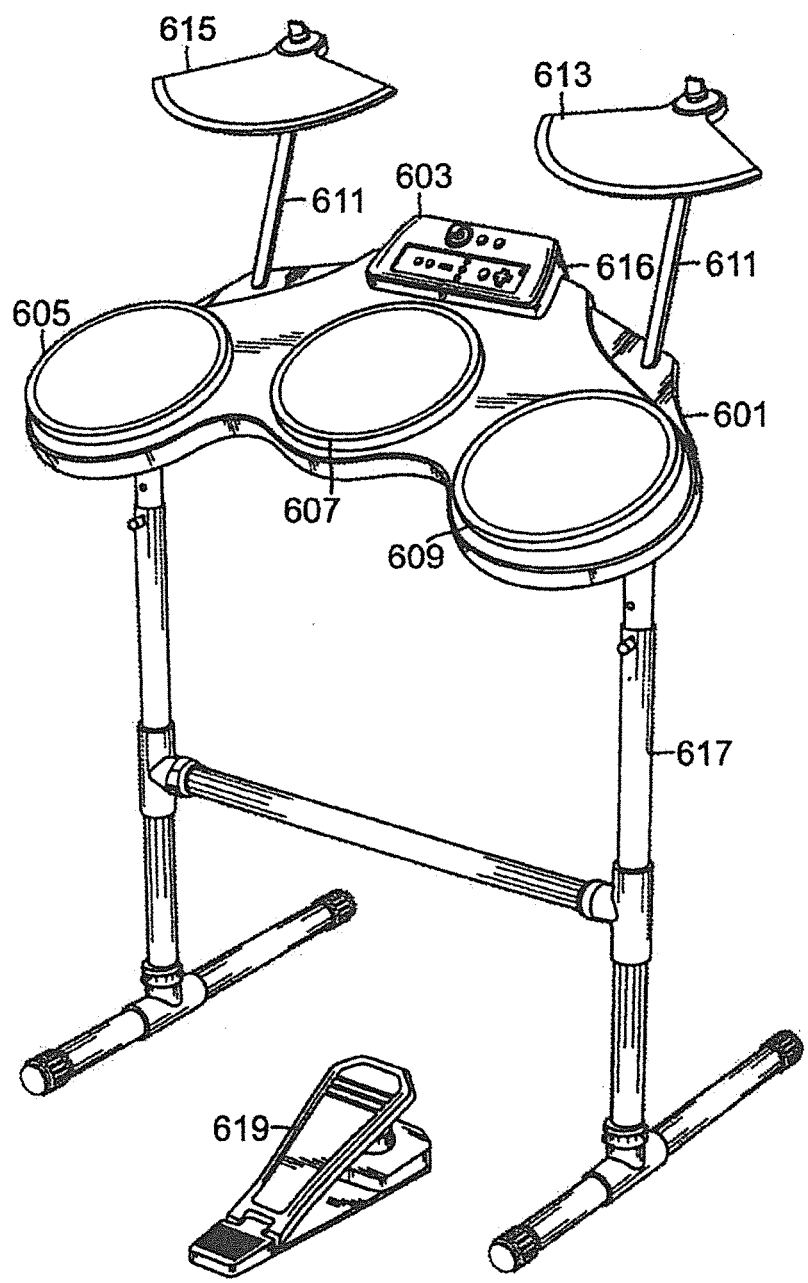
FIG. 6 is a perspective view of a drum system game controller in accordance with aspects of the invention.

FIG. 6 is a perspective view of a drum system game controller in accordance with aspects of the invention. The drum system includes a drum platform 601 providing physical support for drum pads and a control interface at a convenient angle for a drum player, a lower support structure 617 for supporting the drum platform, and a kick drum pedal 619 providing a pedal shaped sensor device for receiving input associated with a kick drum (not shown). In one embodiment, the pedal shaped sensor device receives input from an additional kick drum-double bass or a high hat control for opening and closing the high hat cymbal. The drum platform 601 includes a detachable control interface 603 for receiving control input from a drum player for controlling game play, a snare drum 605 providing a drum head shaped sensor pad for capturing snare input, a high tom-tom drum 607 providing a drum head shaped sensor pad for capturing high tom-tom input, and a low tom-tom drum 609 providing a drum head shaped sensor pad for capturing low tom-tom input.

The drum platform 601 further includes two mounting recesses for coupling with two vertical supports 611. A crash cymbal pad 613 that provides a partial semicircular shaped sensor pad for receiving cymbal input is mounted to the vertical support 611 to the right side of the drum platform. A hi-hat cymbal pad 615 that provides a partially semicircular shaped sensor pad for receiving cymbal input is mounted to the vertical support 611 to the left side of the drum platform. The drum platform 601 also includes a MIDI input 616 (not visible) for receiving MIDI data from an external device (e.g., a keyboard, drum machine or other musical device). The lower support structure 617 is coupled to and supports the drum platform 601 from the ground. In several embodiments, the support structure is collapsible for easy storage and shipping.

In the illustrated embodiment, the kick drum pedal 619 is coupled to the drum system wirelessly. In other embodiments, the drum pedal 619 is coupled to the drum system using a cable. The detachable control interface 603 can be removed from the drum platform. In a number of embodiments, control interface units that support different game systems can be coupled to the drum platform. In some embodiments, the drum system is wirelessly coupled to a game console (not shown). In other embodiments, the drum system is coupled to the game console (not shown) using a cable including one or more conductors of electrical or optical signals.

In some embodiments, the drum system includes a second hi-hat control pedal that can be repeatedly depressed during part or all of a drum solo or during regular game play to keep the tempo of the song, to simulate an open, closed or medium tension of two hi-hat cymbals, or to provide actual control over the sound of the hi-hat, which can be closed, open, or medium during live drum playing or recording. In such case, for example, expert players could be required, or receive a bonus, to keep a tempo of a song for continuous sections of the song or for drum solos while playing the beats and rhythms which would indicate four limb independence. In one embodiment, visual indicators are provided within the scrolling instructive display or by other means to instruct the player on how and when to play the hi-hat control pedal. For example, special cymbals could be provided on the standard scrolling note indicator or the simulated hi-hat drum to indicate a closed, open or medium position for the hi-hat pedal. In some embodiments, visual indicators such as an additional lane and/or additional notes on the left edge of the scrolling display can indicate a tempo to be played on the hi-hat.

In one embodiment, the MIDI interface 616 includes both MIDI In and MIDI Out connectors. In another embodiment, the MIDI interface 616 includes only the MIDI In connector. In some embodiments, the MIDI connectors include a five pin DIN connector. In other embodiments, other connectors can be used to implement the MIDI interface.

The drum and cymbal pads generally have color bands that outline the perimeter of the pads. The color bands correspond to instructions provided during game play that are indicative of which drum or cymbal pad to strike at a particular time. For example, in one embodiment, the snare drum pad 605 has a red outline, the high torn-tom drum pad 607 has a blue outline, the low tom-tom drum pad 609 has a green outline, the hi-hat cymbal pad 615 has a yellow outline, and the crash cymbal pad 613 has an orange outline. In other embodiments, other colors and other methods for marking the drum pads with various colors can be used. In some embodiments the color indicators can be removed or changed.

In a number of embodiments, the drum controller includes both physical settings and software based settings for accommodating drum play by either left handed or right handed players.

Figure 7:
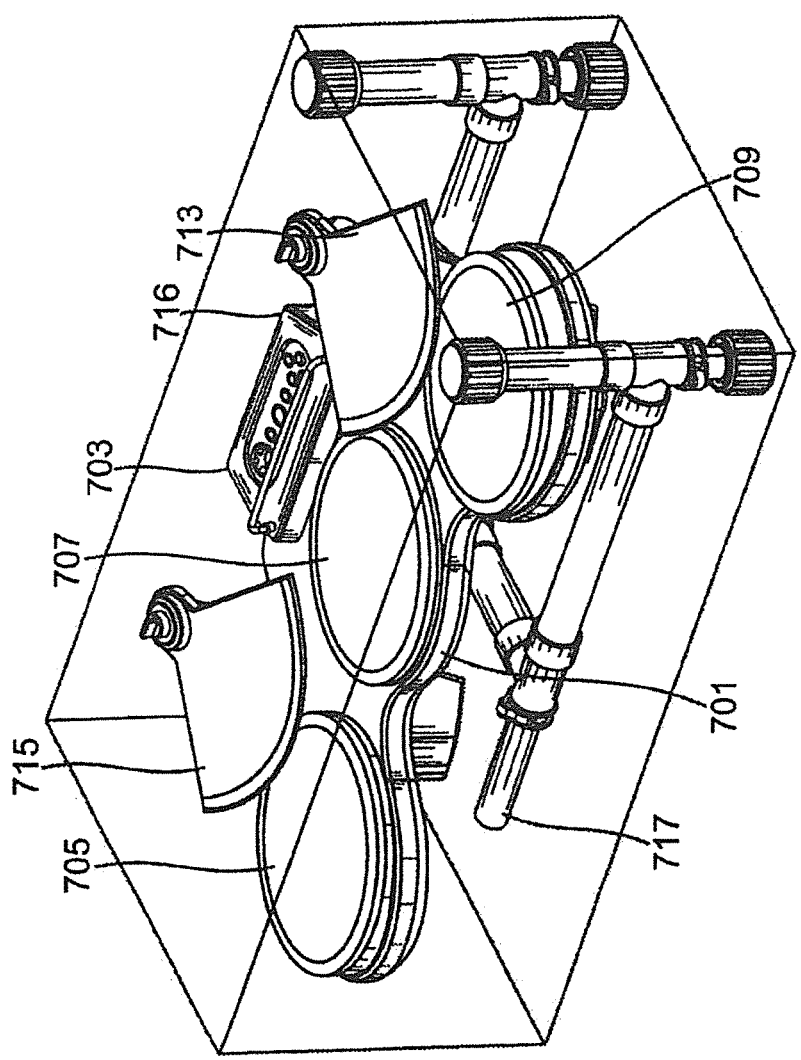
FIG. 7 is a perspective view of a drum system game controller in a collapsed configuration in accordance with aspects of the invention.

FIG. 7 is a perspective view of a drum system game controller in a collapsed configuration in accordance with aspects of the invention. The drum system includes a drum platform 701, a lower support structure 717 in a collapsed configuration, a detachable control interface 703, a snare drum 705, a high tom-tom drum 707, a low tom-tom drum 709, a crash cymbal pad 713, a hi-hat cymbal pad 715. The drum platform 701 also includes a MIDI input 716 (not visible) for receiving MIDI data from an external device. In the illustrated embodiment, the cymbal pads (713, 715) have been retracted towards the drum platform 701 using a release mechanism (not visible). In addition, the support structure 717 has been collapsed by the retraction of a number of telescoping members. In the illustrated embodiment, the entire drum system has been collapsed such that the drum system can be stored in significantly less space than when it is set up for game play. In one embodiment, the collapsed drum system is stored in less than half of the space required of a fully extended drum system. In one embodiment, the drum system can fit in a box measuring 278 millimeters (mm) by 392 mm by 715 mm.

FIG. 8 is a front view of a collapsible drum support structure in an extended configuration in accordance with aspects of the invention. The drum support structure includes two vertical telescoping rods (803, 805) for varying the height supported by the structure, two quick release clamps (807, 809) for enabling a user to adjust the height of the vertical telescoping rods (803, 805), a horizontal telescoping rod 811 for varying the width of a horizontal support member, a third quick release clamp 813 for enabling a user to adjust the width of the horizontal telescoping rod 811, and two base support members (815, 817) for providing lateral support on the ground. In one embodiment, a faux outer bass drum head holder, capable of holding custom graphics can be attached to the crossbar or other components of the structure.

In operation, the user can release any of the quick release clamps to collapse the entire drum support structure for storage. Alternatively, the user can release any of the quick release clamps to suit a height of the drum system preferred by the user, or to find the most stable configuration based on the environment surrounding the drum system (e.g. user's home).

FIG. 9 is a front view of the collapsible drum support structure of FIG. 8 having a horizontal telescoping rod 811 in a retracted position in accordance with aspects of the invention. In FIG. 9, the horizontal telescoping rod 811 has been retracted such that the width of the support system has decreased from 430 mm to 380 mm.

FIG. 10 is a front view of the collapsible drum support structure of FIG. 8 having both vertical and horizontal telescoping rods in retracted positions in accordance with aspects of the invention. In FIG. 10, the horizontal telescoping rod 811 has been retracted such that the width of the support system has decreased from 430 mm to 380 mm. In FIG. 10, the vertical telescoping rods (803, 805) have been retracted such that the height of the support system has decreased from 720 mm to 500 mm.

FIG. 11 is a side view of the collapsible drum support structure of FIG. 8 illustrating a base telescoping rod in an extended position in accordance with aspects of the invention. The vertical telescoping rods (803, 805) have been retracted such that the height of the support system has decreased from 720 mm to 500 mm. The support structure includes two base telescoping rods (818, other not visible) for adjusting the width of the base, two quick release clamps (819, other not visible) for enabling a user to adjust the extended length of the base telescoping rods, and four ground supports 821 (two are not visible) for engaging a ground surface.

FIG. 12 is a side view of the collapsible drum support structure of FIG. 11 illustrating the base telescoping rods 818 in a retracted position in accordance with aspects of the invention. The base telescoping rods 818 have been retracted such that the width of the base has decreased from 400 mm to 280 mm.

Figure 13:
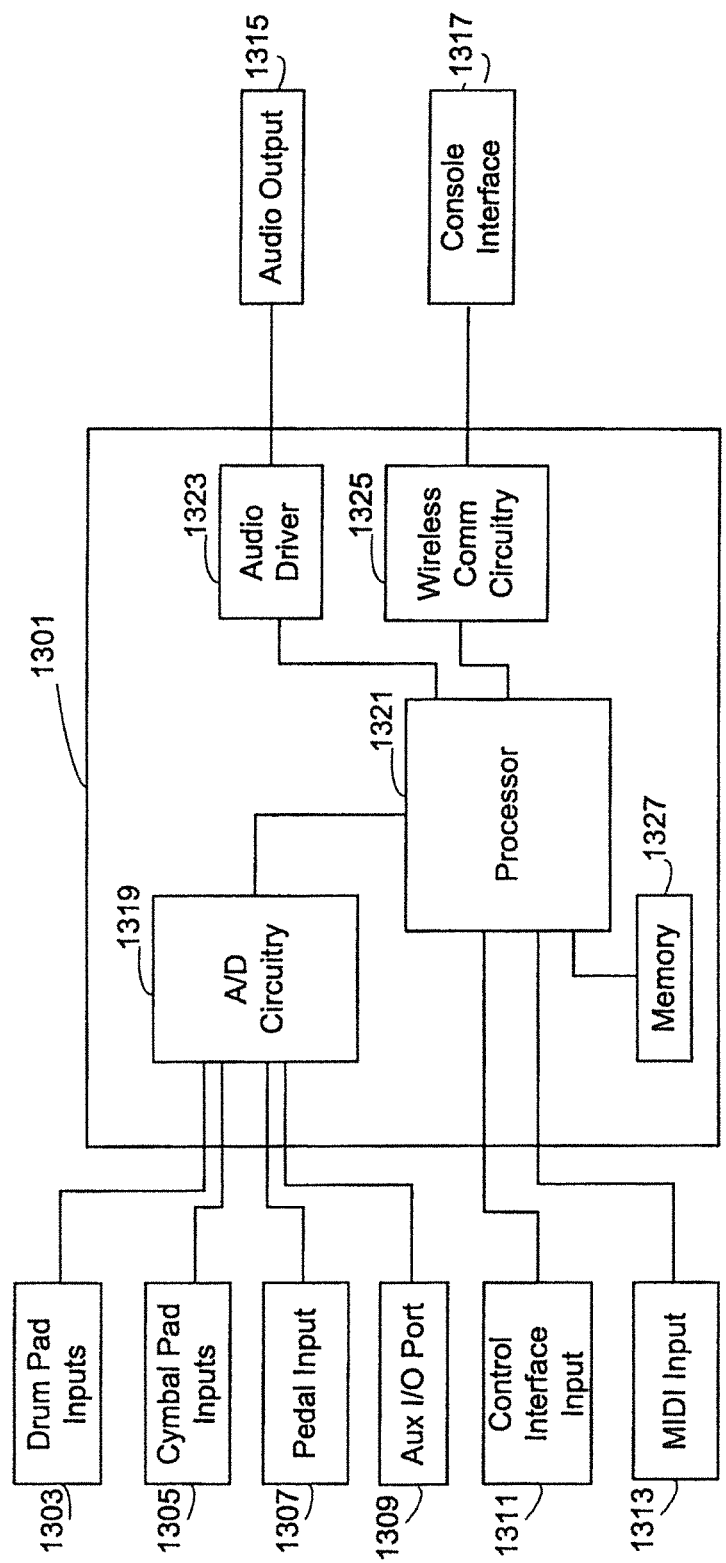
FIG. 13 is an example of a block diagram of a drum system game controller in accordance with aspects of the invention.

FIG. 13 is an example of a block diagram of a drum system game controller in accordance with aspects of the invention. The drum system includes processing circuitry 1301 for processing input from a variety of input sources and communicating with a game console. The processing circuitry 1301 is coupled to drum pad inputs 1303 for providing information indicative of striking actions on one or more drum pads, cymbal pad inputs 1305 for providing information indicative of striking actions on one or more cymbal pads, pedal input 1307 for providing information indicative of compressions of a pedal, an auxiliary input/output (I/O) port 1309 for receiving input from an external device, a control interface input 1311 for providing information indicative of actions administered on the control interface (e.g., using buttons, sticks or other input mechanisms), and a MIDI input port 1313 for receiving MIDI data from an external source (e.g., a keyboard, drum machine or other musical device).

The processing circuitry 1301 is also coupled to an audio output 1315 for providing audio generated by the drum system to a stereo system or other sound generation device, and a wireless console interface 1317 for communicating with a game console. In other embodiments, the processing circuitry communicates with the game console over a wired interface.

The processing circuitry 1301 includes analog to digital (A/D) circuitry 1319 that is coupled to the drum pad inputs 1303, the cymbal pad inputs 1305, the pedal input 1307, and the auxiliary I/O port 1309. The A/D circuitry 1319 is coupled to a processor 1321 for processing input information and communicating with the game console. The processor 1321 communicates with the game console (not shown) via wireless communication circuitry 1325 coupled to the console interface 1317. The processor 1321 can output audio generated by various inputs and stored music information via an audio driver 1323 that provides the audio output 1315. The processor 1321 stores and retrieves information in a memory 1327 coupled to the processor. The memory 1327 can include both volatile and non-volatile memory.

In operation, the A/D circuitry 1319 converts analog signals from each of the analog inputs into digital signals and provides the digital signals via multiple channels to the processor 1321. The processor 1321 receives the digital data from the A/D circuitry 1319 and analyzes the data for a number of characteristics including, for example, magnitude of the digitized signal data and timing of the data.

In some embodiments the A/D circuitry 1319 includes amplifier or pre-amplifier circuitry that amplifies analog output received from any of the analog inputs coupled to the A/D circuitry. In several embodiments, the processing circuitry 1301 includes an oscillator (not shown) for sampling analog data and for providing a clock reference for the processor and other components of the processing circuitry.

The wireless circuitry 1325 can provide wireless communication services to the processor using radio frequency (RF) communication. In other embodiments, other wireless communication methods and frequencies can be used. In some embodiments, the processing circuitry includes additional circuitry that supports a wired connection to the console via the console interface. In one embodiment, the A/D circuitry is coupled to three drum pad inputs, two cymbal pad inputs and one pedal input.

Figure 14:
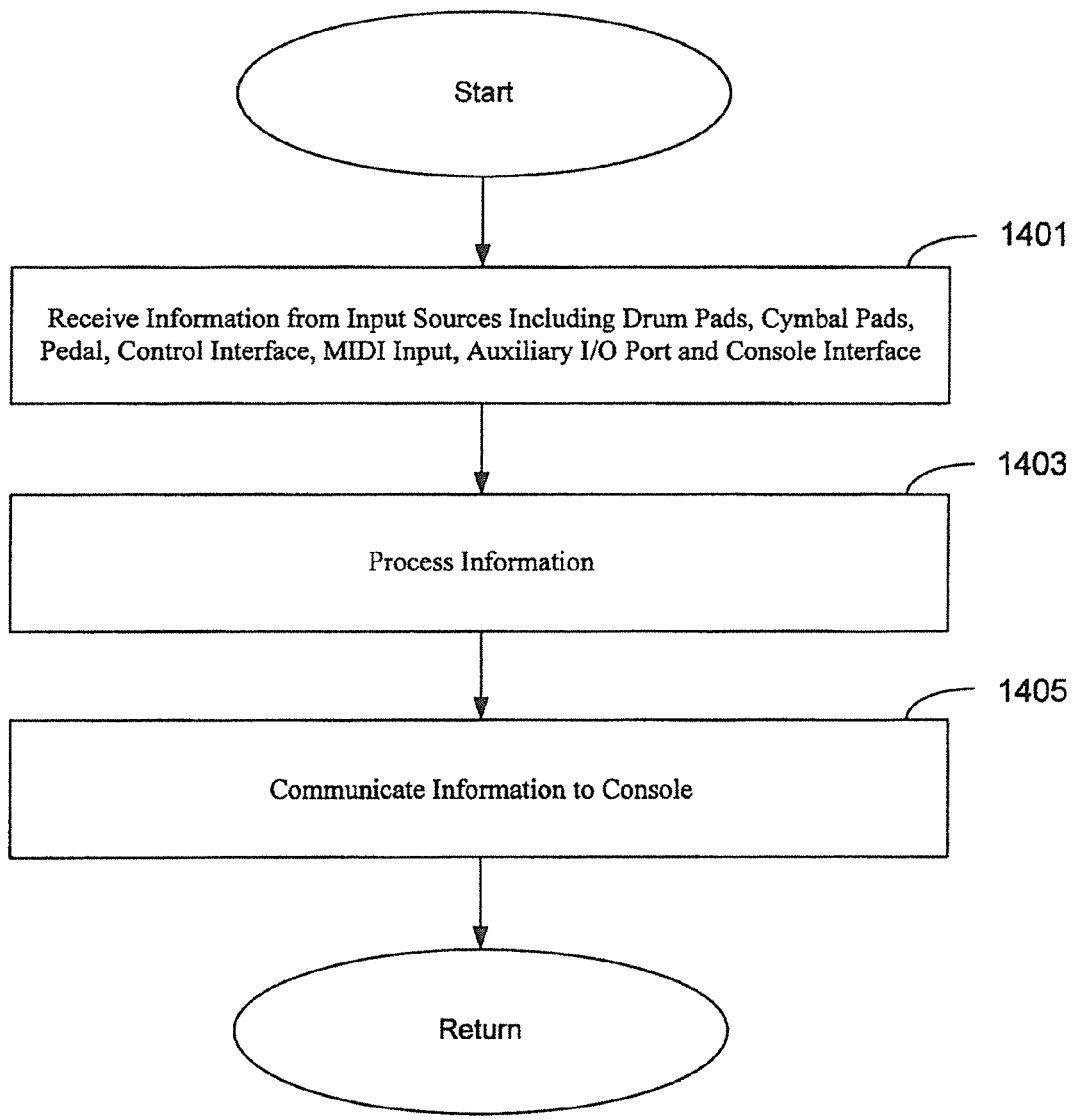
FIG. 14 is a flow diagram of a process for operating a drum system game controller in accordance with aspects of the invention.

FIG. 14 is a flow diagram of a process for operating a drum system game controller in accordance with aspects of the invention. In particular embodiments, the process is used in conjunction with the drum system of FIG. 13. In block 1401, the process receives information from input sources including drum pads, cymbal pads, a pedal, a control interface, a MIDI input, an auxiliary I/O port, and a console interface. In block 1403, the process processes the received information. In block 1405, the process communicates information based on the received information or in response to the received information to a game console via the console interface.

In one embodiment, the process can perform the illustrated actions in any order. In another embodiment, the process can omit one or more of the actions. In some embodiments, the process performs additional actions in conjunction with the process. In other embodiments, one of more of the actions are performed simultaneously.

Figure 15:
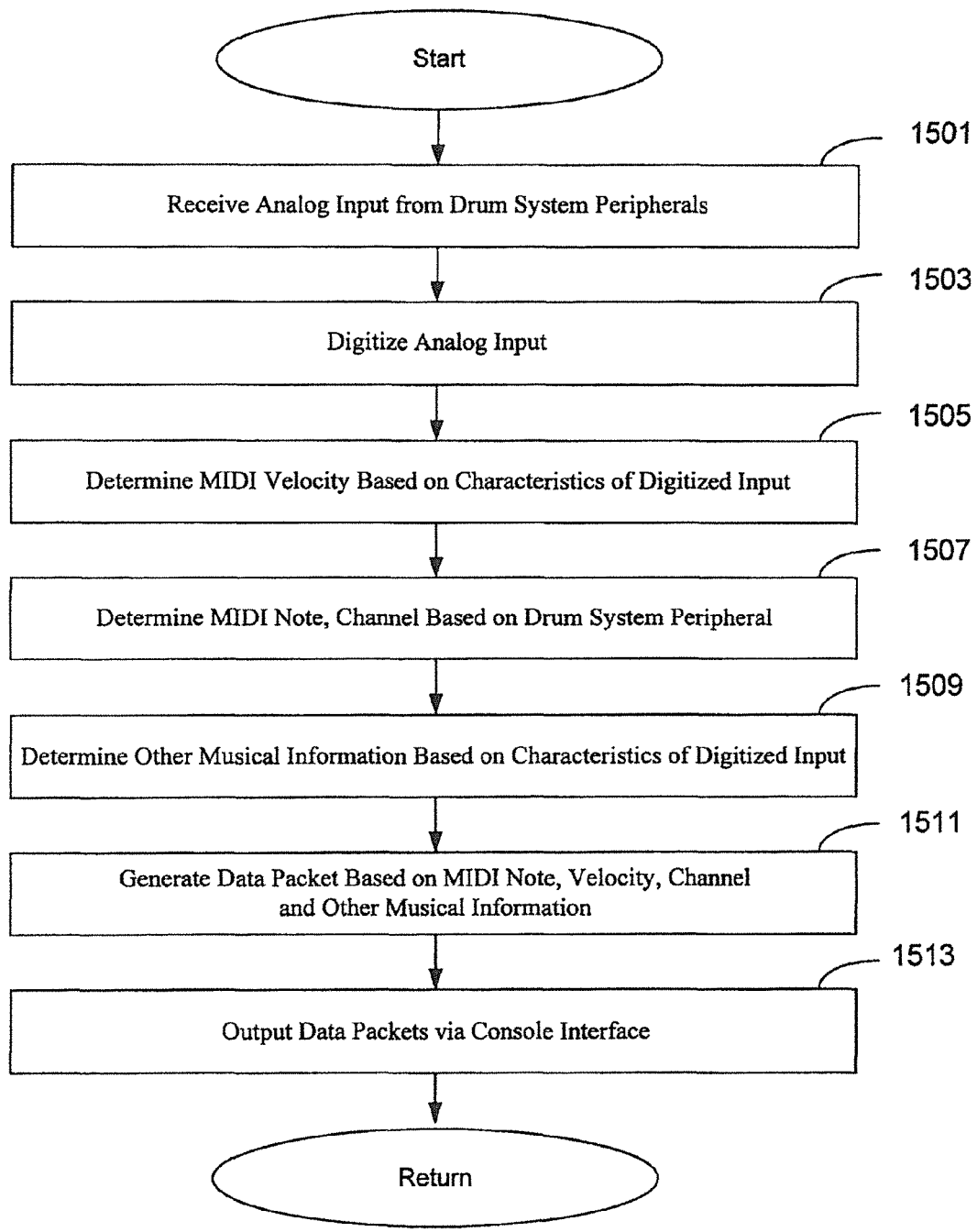
FIG. 15 is a flow diagram of a process for processing analog information received from components of a drum system game controller in accordance with aspects of the invention.

FIG. 15 is a flow diagram of a process for processing analog information received from components of a drum system game controller in accordance with aspects of the invention. In particular embodiments, the process is used in conjunction with the processing circuitry of FIG. 13. In block 1501, the process receives analog input from drum system peripherals. In one embodiment, the peripherals include drum pads, cymbal pads, a pedal, or other analog input devices integrated into simulated components of a drum set. In some embodiments, the peripherals include a bass drum pedal and a hi-hat control pedal. In block 1503, the process digitizes the received analog input. In some embodiments, the analog input for each peripheral is digitized and stored using one byte of data. In block 1505, the process determines a MIDI velocity based on the characteristics of the digitized input. In block 1507, the process determines a MIDI note and channel based on the drum system peripheral generating the input. For example, the MIDI channel number can be 10, which is indicative of drums in the MIDI standard. Further, the MIDI note can be, for example, 38, which is indicative of a snare drum in the MIDI standard.

In block 1509, the process determines other musical information based on the characteristics of the digitized input. In block 1511, the process generates a data packet based on the MIDI note, channel, velocity and other determined musical information. In block 1513, the process outputs the data packets via a console interface. In one embodiment, the process does not generate any MIDI characteristics and only outputs a one byte value indicative of the digitized analog signal.

As a user of the drum system game controller strikes the drums or cymbal pads, problems with interference (e.g. crosstalk) between sensors can arise. For example, based on the sensitivity and proximity of adjacent or nearby drum pad sensors, a strike on the leftmost drum (snare drum) can also cause vibration and a drum pad sensor activation of the middle drum (high tom-tom). Thus, a sensor input is generated by the middle drum even though it was not struck at that time.

In one embodiment, the process can perform the illustrated actions in any order. In another embodiment, the process can omit one or more of the actions. In some embodiments, the process performs additional actions in conjunction with the process. In other embodiments, one or more of the actions are performed simultaneously.

Figure 16:
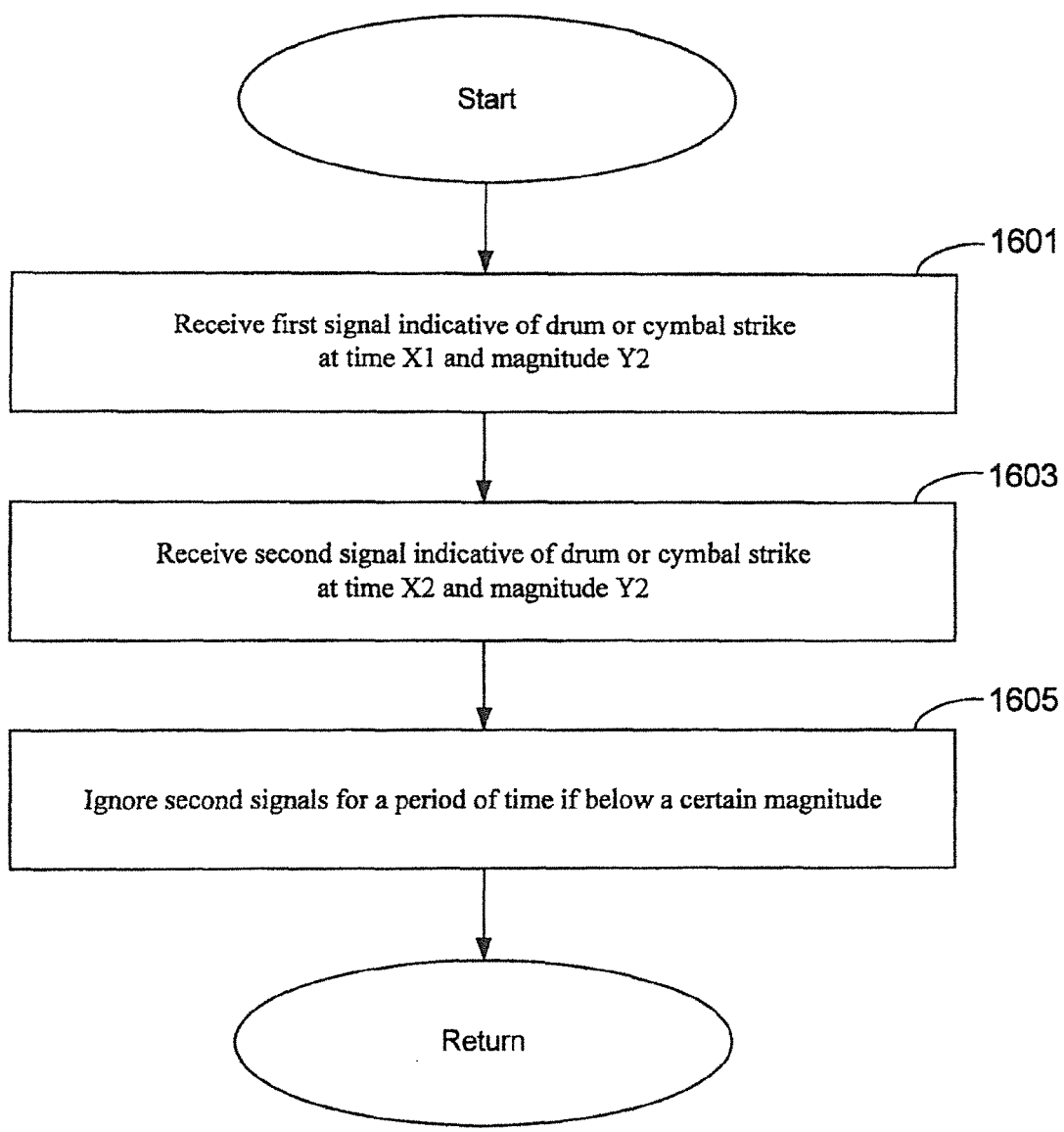
FIG. 16 is a flow diagram of a process for preventing interference between components of a drum system game controller in accordance with aspects of the invention.

FIG. 16 is a flow diagram of a process for preventing interference between components of a drum system game controller in accordance with aspects of the invention. In particular embodiments, the process is used in conjunction with the processing circuitry of FIG. 13. In block 1601, the process receives a first signal indicative of a drum or cymbal strike at a time X1 and a magnitude of Y1. In block 1603, the process receives a second signal indicative of a drum or cymbal strike at a time X2 and a magnitude of Y2. In block 1605, the process ignores the second signal if X2 occurs within a predetermined range of time after X1 and/or if Y2 is less than Y1 within a predetermined range of magnitude. In one embodiment, these ranges can determined by the implementer of the drum system game controller. In other embodiments, these ranges can be modified by the user during game play.

In many embodiments the range of times is based on expected vibration propagation times between drum heads, usually a function of drum stand material and distance between drum heads. In some embodiments, the vibration propagation times are determined empirically. In ignoring the second signal, the process attempts to ensure that no sounds are registered with the drum system for non-strikes of a drum. In some cases, this process can be thought of as a type of sensor/switch de-bouncing.

In some embodiments, the process provides a menu option for a crosstalk de-bounce test mode. In such case, the user can manually adjust any of the parameters involved in the process (e.g., ranges for X1, X2, Y1, and Y2). In one embodiment, the process provides several settings, or groups of parameters, for the user to choose. In other embodiments, the user can directly enter or configure the settings by experimenting with the drum sensors. In some embodiments, the process automatically adjusts the parameters. In one embodiment, the process allows configuration of the bass drum pedal (e.g., degrades or too sensitive-picks up foot related vibrations, false double hits within its own drum head). In several embodiments, the process includes different settings for registering light, medium and hard velocity strikes. In some cases, a knob can be provided on any of the drum or cymbal input devices (e.g., pads or pedals) to adjust sensitivity for a particular input device.

Due to differences in manufacturing processes or the degradation of certain pads over time, some sensor pads may be more sensitive than others. In one embodiment, the process provides a menu option for a pad balancing mode where the game user can balance the drum and cymbal pad sensors to counteract these potential unbalanced sensor effects. In several embodiments, after the user has entered the pad balancing mode, the process instructs the user to strike each pad with the same velocity, displays the velocity, and balances the inputs using an average. In one embodiment, the process uses an automatic gain control to normalize the inputs. In another embodiment, the process provides a manual gain control to enable the user to normalize the pads. In a number of embodiments, the user can effectively modify the sensitivity of any of the pad sensors. In one such embodiment, the process scales input received from the pad sensors in order to effectively modify the sensitivity of the pad sensors in accordance with instructions from the user.

In one embodiment, the process can perform the illustrated actions in any order. In another embodiment, the process can omit one or more of the actions. In some embodiments, the process performs additional actions in conjunction with the process. In other embodiments, one of more of the actions are performed simultaneously.

Figure 17:
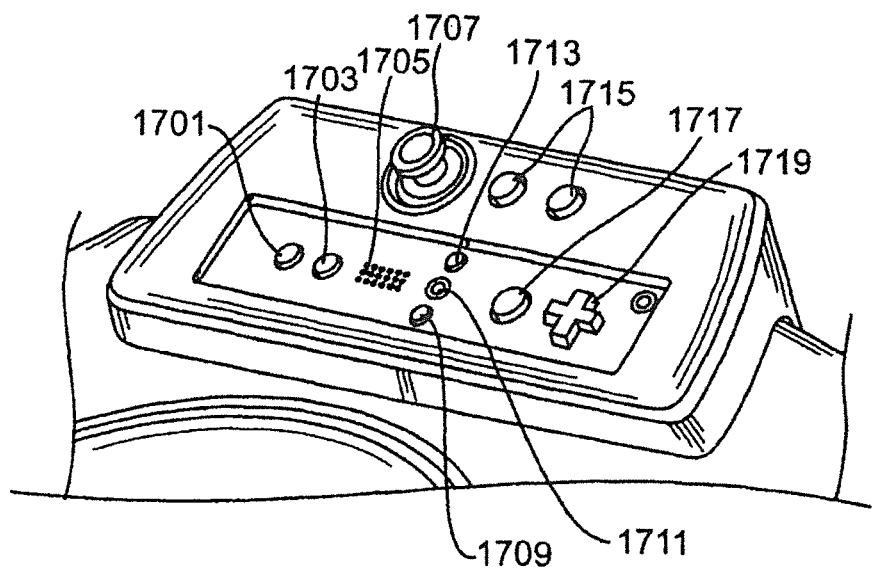
FIG. 17 is a perspective view of a control interface for a drum system game controller in accordance with aspects of the invention.

FIG. 17 is a perspective view of a control interface for a drum system game controller in accordance with aspects of the invention. The control interface is removably coupled with a drum platform of a drum system. In the embodiment illustrated in FIG. 17, the control interface is patterned after a Nintendo Wii game controller. Nintendo and Wii are trademarks of Nintendo Company, Limited of Kyoto, Japan. In the illustrated embodiment, the control interface includes a "Two" button 1701, a "One" button 1703, a speaker 1705, an analog stick 1707, a plus button 1709, a home button 1711, a minus button 1713, two upper control buttons 1715, an "A" button 1717, and a directional pad 1719. In one embodiment, all of the control inputs provide analog information. In other embodiments, some control inputs provide binary output while the other inputs provide analog output. In one embodiment, some of the control inputs are omitted. In some embodiments, additional control inputs are included.

Figure 18:
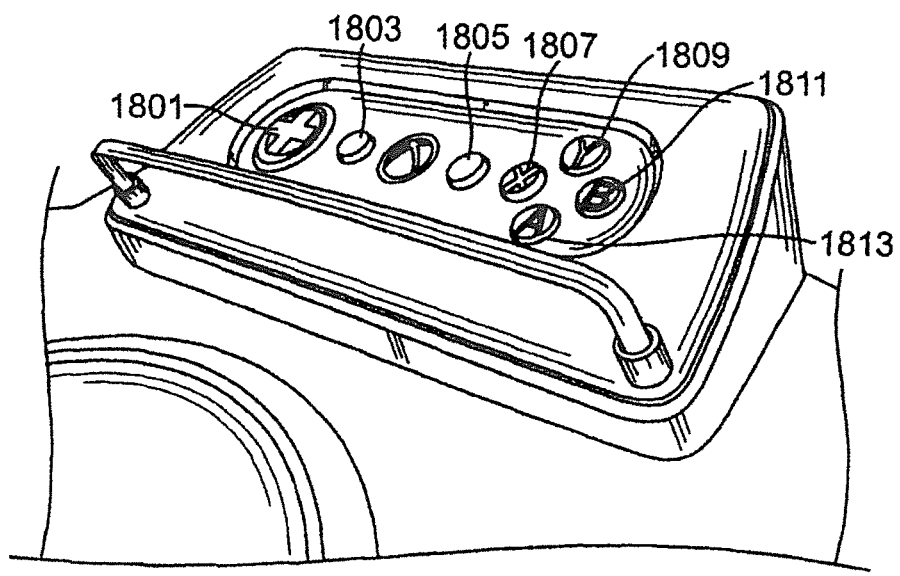
FIG. 18 is a perspective view of a control interface for a drum system game controller in accordance with aspects of the invention.

FIG. 18 is a perspective view of a control interface for a drum system game controller in accordance with aspects of the invention. The control interface is removably coupled with a drum platform of a drum system. Thus, one drum system game controller can be used with different game systems by installing the control interface appropriate to the particular game system to be used. In the embodiment illustrated in FIG. 17, the control interface is patterned after a Microsoft Xbox 360 game controller. Microsoft and Xbox are trademarks of Microsoft Corporation of Redmond, Wash. The control interface includes a directional pad 1801, a back button 1803, a start button 1805, an "X" button 1807, a "Y" button 1809, a "B" button 1811, and an "A" button 1813. In another aspect of the invention, a third party wireless control system can be adhered permanently or semi-permanently to the drum system at the point of manufacture, at retail, or installed by the consumer, allowing one drum set housing to accept a various array of proprietary and dedicated third party wireless control console systems that may have distinct and exclusive operating requirements. In several embodiments, the drum system can be used as a universal wireless MIDI instrument which can couple with other devices via external MIDI port controls.

In one embodiment, all of the control inputs provide analog information. In other embodiments, some control inputs provide binary output while the other inputs provide analog output. In one embodiment, some of the control inputs are omitted. In some embodiments, additional control inputs are included. In one embodiment, analog sticks and/or analog triggers are included. In one embodiment, the "X", "Y", "A" and "B" buttons provide analog output that is converted to a four bit value.

Figure 19:
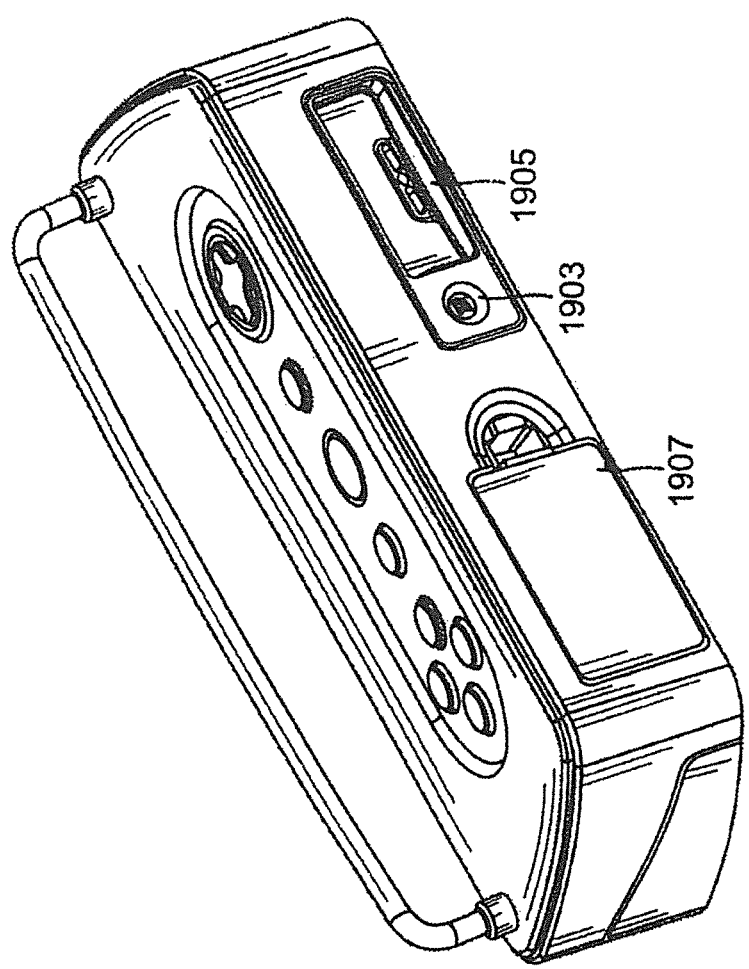
FIG. 19 is a rear perspective view of a control interface for a drum system game controller in accordance with aspects of the invention.

FIG. 19 is a rear perspective view of a control interface for a drum system game controller in accordance with aspects of the invention. The control interface includes a first auxiliary port 1903 for receiving input from a first external source, a second auxiliary port 1905 for receiving input from a second external source, and a releasable door 1907 for providing access to a battery compartment. In the illustrated embodiment, the control interface includes all or some of the control buttons of the control interface of FIG. 18. In several embodiments, the first auxiliary port 1903 is a MIDI IN port and includes a 5 pin DIN connector commonly used for the MIDI standard. In a number of embodiments, the second auxiliary port 1905 is a multi-pin connector that is configured to receive input from a pedal device such as, for example, the kick drum pedal of FIG. 6. In other embodiments, these auxiliary inputs can be used to receive input from other external devices or communicate with other external devices.

Figure 20:
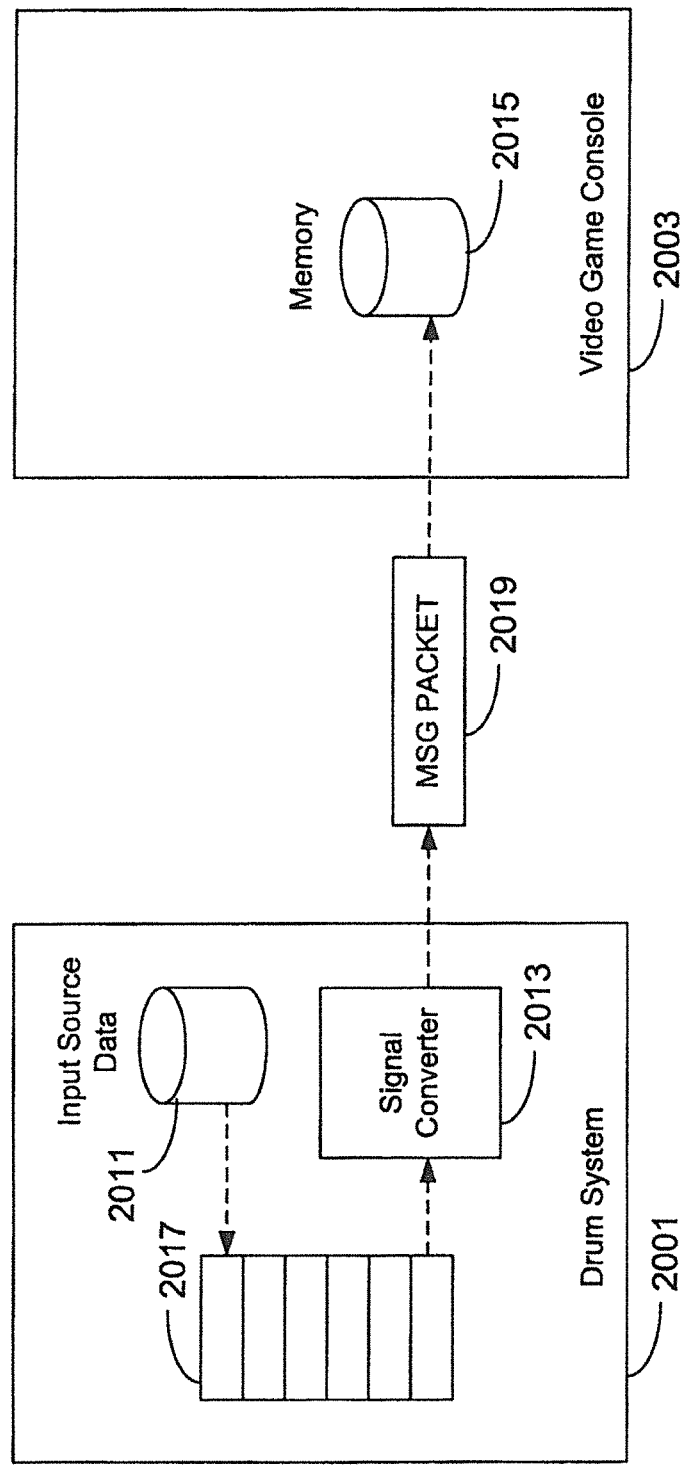
FIG. 20 is an example of a block diagram of a drum system game controller in communication with a game console in accordance with aspects of the invention.

FIG. 20 is an example of a block diagram of a drum system game controller 2001 in communication with a game console 2003 in accordance with aspects of the invention. The drum system 2001 communicates with the game console 2003 through either a wired or a wireless connection. In some embodiments, the drum system is used in accordance with a music based multi-player video game including drum simulations. In other embodiments, this wireless drum interface can be used for other types of non-musical games. In some embodiments of the invention, the drum system generates signals which are compliant with the MIDI standard. The drum system of FIG. 20 includes memory 2011 containing input source data from at least one MIDI compliant input source, and a signal converter 2013 including control circuitry within the drum system that converts signals into message packets recognizable by the associated video game console. The video game console in FIG. 20 includes console memory 2015, among other components, for storing received message packets. In some embodiments of the invention, the MIDI compliant input sources may be different types of percussion based input sources in the form of drum pads or other depressible inputs, for example, foot pedals. In some embodiments, the drum system may include a MIDI IN port that allows external MIDI devices to be plugged into the drum system. In such case, the input devices may be non-percussion based input devices, for example, a keyboard or microphone.

In operation, a user activates one of the input sources by, for example, striking the surface of an available drum or cymbal pad of the drum system. In some embodiments, a piezo sensor below the surface of the drum pad detects the strike, and generates an analog signal based on the strike. In several embodiments, for example, the magnitude of the analog signal is used as the intensity or velocity of the strike. In some embodiments, the analog signal is digitized into a MIDI compliant signal by control circuitry of the drum system. In some embodiments, the MIDI compliant signals from the various input sources are arranged into a six element array 2017, where each element is a one byte value indicative of the magnitude of one of six input sources including three drum pad inputs, two cymbal pad inputs and one foot pedal input. A signal converter converts the MIDI compliant signals into message packets 2019 recognizable by the video game console, the process of which is discussed in further detail in FIGS. 21 and 22 below.

Message packets are transmitted from the drum system to the video game console. The video game console generally receives the message packets and stores them in console memory 2015. A processor of the video game console may retrieve the message packets from the memory and process the message packets to generate audio and video output signals associated with video game play. For example, different drum audio samples may be generated based on strikes applied to the different input sources of the drum system. Further details of the output generation process associated with the invention are presented in FIG. 23 below.

Figure 21:
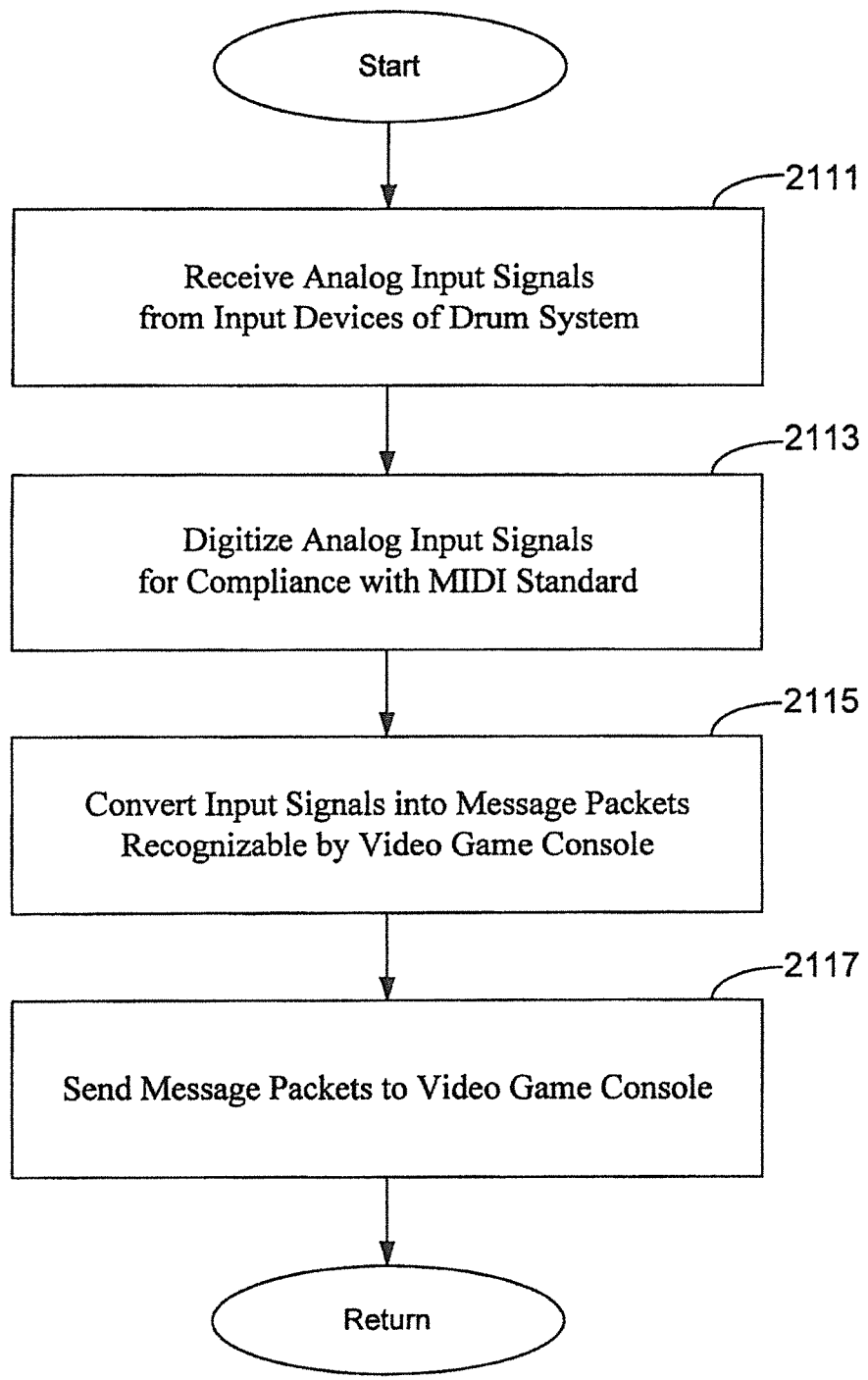
FIG. 21 is a flow diagram of a process for generating and communicating MIDI data in accordance with aspects of the invention.

FIG. 21 is a flow diagram of a process for generating and communicating input data packets in a format compatible with an associated video game console in accordance with aspects of the invention. In some embodiments, the process is used to generate signals for a plurality of input sources of the drum system as has been described herein. In some embodiments, the process generates signals which are MIDI compliant. The MIDI standard may be desirable for its versatility and its wide range of compatibility. Some embodiments of the invention, for example, provide for connectivity with additional input devices. MIDI compliance can allow for potential compatibility and synchronization with any connected MIDI compatible input device.

In block 2111, the process receives analog signals from input sources of a drum system. Each analog signal may correspond to one input source of a drum system. For example, for the drum system described with respect to FIG. 6, there may be individual analog signals received from input sources simulating a snare drum, a kick drum, a high tom-tom, a low tom-tom, a hi-hat cymbal, and a crash cymbal. An analog signal may be generated when an input source of the drum system, for example, a drum pad, is struck or depressed. In several of these embodiments, the analog signal is based on, for example, the magnitude or force of the strike or the velocity of the strike or movement of the drum pad. In some embodiments, each input source of the drum system is continually monitored or polled, and analog input signals corresponding to the status of each input source are continually generated. In such case, changes to an input signal indicate that the corresponding input source has been struck or otherwise actuated.

In block 2113, the process normalizes and digitizes the analog input signals to be compliant with the MIDI standard. In embodiments where the generated analog signals correspond to a strike velocity of one of the input sources of the drum system, the analog signal may be converted to a corresponding digital value based on an interpolation of the strike velocity between a minimum possible velocity and a maximum possible velocity for the input source. In some embodiments, including embodiments compliant with the MIDI standard, an analog signal corresponding to a strike velocity may be normalized to a value between 0 and 127, and may be converted to a one byte value.

Generally, MIDI data is 3 bytes including one byte for a MIDI channel number, one byte for a MIDI note number, and one byte for a MIDI velocity number. An instrument definition, or MIDI channel number, is available for drums, or a drum kit, in the MIDI protocol and is assigned to MIDI channel 10. Consequently, for some embodiments of the invention, the MIDI channel number is fixed to channel 10. Likewise, various individual drum sounds, including drum sounds associated with several of the input sources described with respect to the drum system of FIG. 13, can be assigned note numbers under MIDI channel 10. For example, a snare drum sound can be assigned to note number 38, and a kick drum sound can be assigned to note number 36. Further discussion of the specific MIDI note numbers corresponding to preexisting drum sounds in the MIDI protocol may be found with respect to FIG. 22 below. Thus, in some embodiments of the invention, both the MIDI channel number and the MIDI note number are fixed for each individual input source in the drum system. In such case, the velocity number for each input source is therefore the principle variable value. As the velocity number is generally a one byte value, in embodiments of the invention with six different input sources, each set of input signals from the drum system may comprise 6 bytes of data.

In block 2115, the process converts the MIDI data into message packets recognizable by an associated video game console. Each video game console has a unique controller application programming interface for a default video game controller associated with the video game console. Generally, to be compatible with a video game console, inputs of new video game controllers and peripherals to be used with the video game console are mapped according to the console's controller application programming interface. In other words, the new input sources are associated with, or mapped to, existing control channels (e.g., defined input sources) of a default video game controller. In some embodiments of the invention, the input sources of the drum system may be mapped to existing control channels. As information pertaining to the mapping of the MIDI channel number and the MIDI note numbers can be fixed values the process generally does not repeatedly process and regenerate those values. Instead, the channel number and note number assignments, or equivalent information, may be stored and retrieved from a separate removable memory source including video game instructions, for example, a video game CD-ROM.

In some embodiments of the invention, the process generates message packets from an array of the velocity numbers for each of the different input sources. The table of FIG. 22 discussed below shows an example of a message packet array, or array of velocity numbers, having six elements as well as examples of mappings of each of the elements of the array to various inputs on default video game controllers for different video game consoles. In other embodiments, including some embodiments which do not conform to the MIDI protocol, circuitry within the drum set peripheral may further process the signals received from the input sources, and generate message packets which contain more detailed information, for example, information on volume of desired audio outputs.

In block 2117, the process sends the generated message packets to a connected video game console. In some embodiments, the drum system includes control circuitry which directs the message packets to be sent to a connected video game console, and the message packets are delivered, either through a wired or wireless connection. In some embodiments, the message packets are configured to be compatible with the controller application programming interface of the video game console, so that the video game console recognizes and is able to process the message packets without modification to program instructions associated with the video game console. In some embodiments, video game instructions stored on the removable memory source, for example, a video game CD-ROM inserted into the video game console, include detailed instructions for processing received message packets. After the process sends the generated message packets to the video game console, the process returns.

In one embodiment, the process can perform the illustrated actions in any order. In another embodiment, the process can omit one or more of the actions. In some embodiments, the process performs additional actions in conjunction with the process. In other embodiments, one or more of the actions are performed simultaneously.

FIG. 22 is a table illustrating an example of MIDI data mapped to a message packet format suitable for control channels of different video game systems in accordance with aspects of the invention. The table includes columns for MIDI note numbers 2201, MIDI velocity numbers 2203, and examples of input source associations for various video game consoles 2205. In some embodiments, the message packet array comprises the collection of velocity numbers 2207 of FIG. 22.

In FIG. 22, the message packet array includes six MIDI velocity numbers. Recall that each packet of standard MIDI data includes a channel number, a note number, and a velocity number. In accordance with the MIDI standard, a "General" MIDI drum kit is typically located on MIDI channel 10. Some embodiments of the invention utilize the channel 10 drum kit. Therefore, the channel number is not generally reproduced each time a message packet is generated by the drum system. Each of the six velocity numbers in FIG. 22 is also associated with a MIDI note number, and corresponds to a drum sound available in a general MIDI drum kit.

In the illustrated embodiment, for example, the first velocity number 2209 has a value of 64 and corresponds to a snare drum sound 2211 mapped to MIDI note number 36, and the last velocity number 2213 has a value of 0 and corresponds to a crash cymbal sound 2215 mapped to MIDI note number 49. Like the channel number, the note number association for each value in the array generally remains constant, and also is not reproduced in each message packet array. In some embodiments, the channel number and note number associations for each value in the message packet array are stored by the video game console. In some other embodiments, the entire MIDI data signal, including channel number, note number, and velocity number, may instead be stored in the array. In such case, each separate MIDI data signal would occupy 3 bytes of data, and the array of FIG. 22 would comprise 18 bytes of data.

As discussed with respect to block 2115 of FIG. 21, each individual video game console includes a controller application programming interface. The video game console is programmed to recognize specific input signals from a default video game controller associated with the video game console, for example, a video game controller packaged together with the video game console for retail sale. For newly developed peripherals, the input signals generated by the new peripherals are generally mapped into the framework of the existing controller application programming interface. Each of the input sources of a new peripheral is mapped to an already existing input source on the default video game controller. Compliance with the controller application programming interface ensures compatibility of new peripherals with the video game console.

Therefore, in some embodiments of the invention, the values in each message packet array are mapped to existing analog inputs of a default video game controller associated with each different video game console. The table of FIG. 22 illustrates examples of possible input mappings for the Xbox 360 2217, the Nintendo Wii 2219, and the Playstation 3 2221. Playstation is a trademark of Sony Corporation of Tokyo, Japan. Nintendo and Wii are trademarks of Nintendo Company Ltd., of Kyoto, Japan. Note that the input mappings presented in FIG. 22 are arbitrary, and mappings in different embodiments of the invention may vary.

In the embodiment of FIG. 22, the velocity number 2223 for the hi-hat cymbal 2225 is 50. In embodiments where the drum system is connected to a Nintendo Wii video game console, the table indicates that the velocity number value may be mapped to, for example, the analog Z button on a Nunchuk controller 2227 for the Nintendo Wii. A processor of the Nintendo Wii may receive the message packet array of FIG. 22, and an input signal generally associated with an analog Z button input may include an input value of 50. If Z button range does not directly support the input value, the input value may be mapped to an appropriate value within a range of acceptable values for the Z button. Based on video game instructions, the processor of the Nintendo Wii console may generate a MIDI data signal using the input value, and in some cases, after the input signal has been de-mapped. The video game instructions may direct the processor to assign the input value to a MIDI velocity number, paired with a MIDI channel number 10 and a MIDI note number 46. A complete 3 byte MIDI data signal for the hi-hat input may thus be generated in this fashion using a one byte signal from the message packet array. Alternatively, if the drum system is connected to a Playstation 3, based on the embodiment of FIG. 22, a Playstation 3 console may recognize the input value as an analog O button input associated with a Playstation 3 video game controller 2229. The console may likewise generate a complete MIDI data signal from the one byte input value.

Each controller application programming interface allocates a fixed amount of available signal memory with which a game controller may associate its various input sources. For example, the Xbox 360 controller application programming interface currently allocates 10 bytes of memory to analog signals. Memory distribution may vary between different video game consoles as well. For example, on the Xbox controller, 2 bytes of memory may be allocated for each axis of each analog control stick, one byte for movement along an axis in, for example, a positive direction, and one byte for movement along the axis in, for example, a negative direction. In these embodiments, therefore, each analog control stick may include 4 bytes of useable memory. Furthermore, one byte of memory may be allocated, for example, for each analog trigger button on the default Xbox video game controller. If a default Xbox video game controller includes two analog control sticks and two trigger buttons, 10 bytes of memory allocated to analog signals are therefore provided. The message packet array of FIG. 22 may be mapped to any 6 bytes of the available 10 bytes of memory. Both the Nintendo Wii and the Playstation 3 also provide for at least 6 bytes of analog signal memory in their respective controller application programming interfaces. Therefore, the array of FIG. 22 may be mapped within their respective controller application programming interfaces as well.

Remaining unused memory allocations, for example, the 4 bytes of unused analog signal memory for the Xbox controller application programming interface, may be used for add-ons to the drum system. For example, in embodiments of the invention with a MIDI IN port, any unused memory allocations may be used to map various types of input devices configured to plug in to the MIDI IN port and communicate with the drum system.

Figure 23:
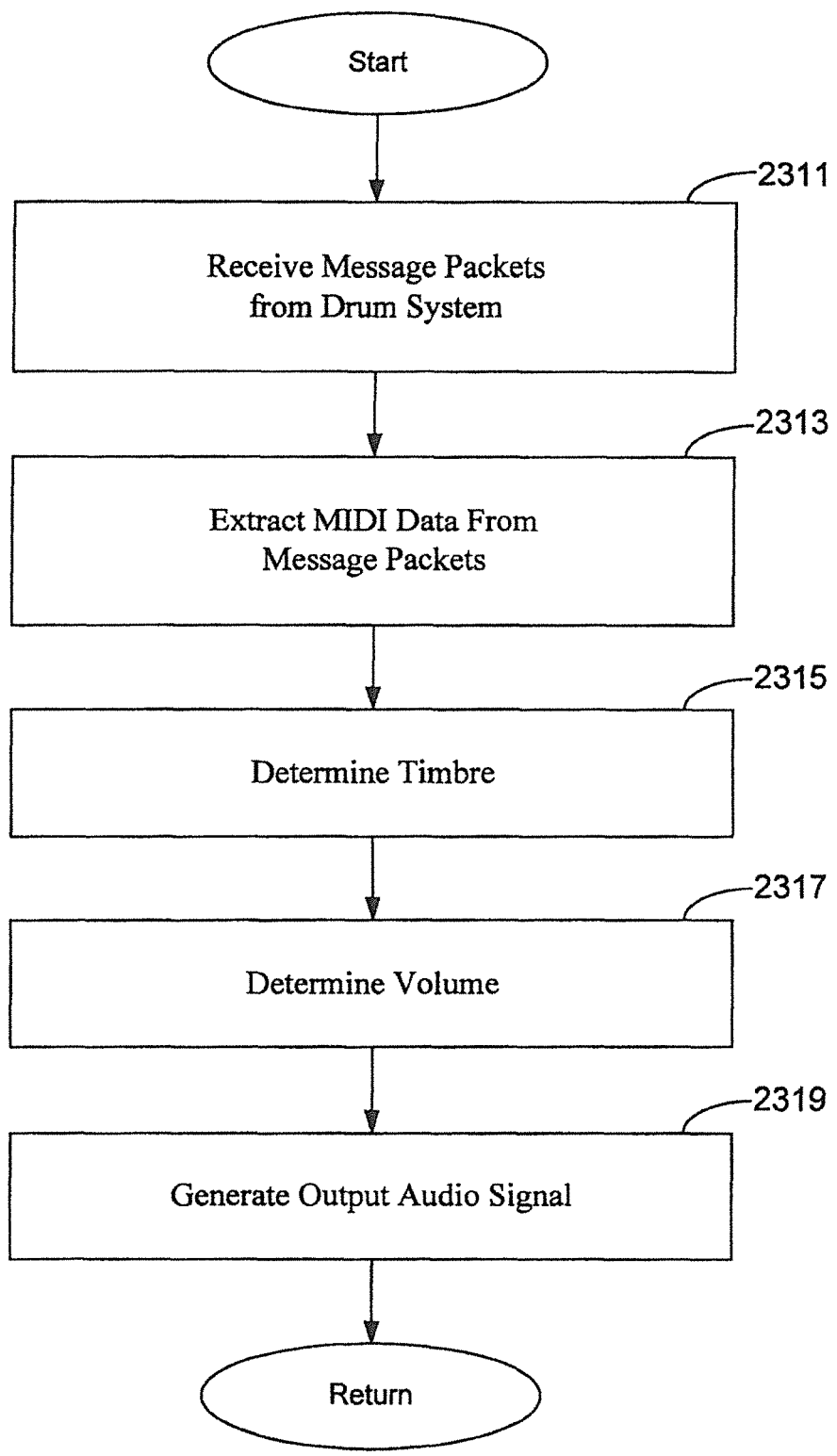
FIG. 23 is a flow diagram of a process for receiving and processing MIDI data encoded in message packets in accordance with aspects of the invention.

FIG. 23 is a flow diagram of an output signal generation process in accordance with aspects of the invention. In some embodiments of the invention, the process receives and processes signals received from the drum system. The signals may be in the form of, for example, the message packet array as described with respect to FIG. 22. The process generates audio, and in some embodiments, video signals based in part on the input signals received from the drum system.

In block 2311, the process receives a message packet from a drum system. In some embodiments of the invention, the message packet is arranged similar to the message packet array of FIG. 22, with a one byte source value for each of the six input sources of the drum system. In other embodiments of the invention, there may be more than or less than six elements depending on the number of different input sources in the drum system, and the data signals may be packed or arranged in a different manner.

In block 2313, the process extracts the MIDI data from the received message packets. The extracted data may be MIDI velocity numbers from different input sources of the drum system, as has been discussed. In some embodiments, a MIDI data signal is generated for each of the input signals in the message packet. In other embodiments, a MIDI data signal is only generated for input signals having a non-zero value. In several of these embodiments, for example, MIDI data signals may be generated for the snare drum input and hi-hat cymbal input in the message packet array of FIG. 22. In some embodiments, the MIDI channel number and MIDI note number associated with each respective input signal are stored in memory. MIDI data signals are generated by retrieving channel numbers and note numbers, and associating a data signal for each input of the message packet, the data signal including a channel number, a note number, and a velocity number. Referring back to FIG. 22, the MIDI data signal corresponding to the snare drum input signal would be channel 10, note 36, and velocity 64.

In block 2315, the process determines a timbre from the velocity number of a MIDI data signal. In embodiments of the invention, different timbres may be different sounds which are associated with a single instrument or input source. For most instruments, volume is not the only variable characteristic of a generated sound. For example, characteristics of a strike on a snare drum, such as initial pitch, depth of tone, and sound resonance, may vary based on whether the snare drum is struck forcefully or struck softly. In some embodiments of the invention, the timbre is determined based on the strike velocity. For a strike velocity range of 0 to 127, a snare drum may encompass, for example, three different timbres. A range corresponding to a first timbre may include velocities between 1 and 40, a second timbre may include velocities between 41 and 90, and a third timbre may include velocities between 91 and 127. The MIDI data signal discussed in block 2313 and having a value of 50 would therefore fall within the second timbre range in this example. Each different MIDI data signal may include a different number of timbres, and each timbre may occupy different velocity ranges, depending on the characteristics of each input source.

In block 2317, the process determines a volume of the timbre. In some embodiments of the invention, the volume of the timbre is based on an interpolation of the velocity number within the range of the particular timbre. In other embodiments, the volume of the timbre is based on the offset into the timbre range. For example, for the snare drum MIDI data signal discussed above, the second timbre spans velocities 41 to 90. A low volume of the timbre is generally associated with velocity 41, and a high volume of the timbre may be associated with velocity 90. The volume associated with a velocity number 64 may be determined, for example, by linearly interpolating between the low volume and the high volume. In other embodiments of the invention, the interpolation or alternate calculation of the volume may be determined in various different ways. In some embodiments, the velocity number of a MIDI data signal may also be used to determine a variety of other audio characteristics, or for example, visual outputs.

In block 2319, the process generates an output audio signal. The output signal selected is based on a variety of factors. The process may first select a percussive instrument based on the MIDI channel number and MIDI note number. The channel numbers and note numbers presented herein conform to the widely accepted and implemented General MIDI standard, which includes the drum kit as has been discussed. In the snare drum example above, a channel 10 and note 36 corresponds to a snare drum in the General MIDI drum kit. The process may then retrieve an audio sample based on the determined timbre associated with the selected percussive instrument. Audio samples may be stored on, for example, a video game CD-ROM containing video game instructions or in a memory. The process may then output the timbre audio sample at the determined volume. A processor of the video game console may alternatively create audio generation information based on the audio sample and output volume, and send the audio generation information to an audio driver associated with the video game console to generate the actual audio output signal. In some embodiments, various types of video output signals may also be generated based on the MIDI data signals. After the output signals are generated, the process returns.

In one embodiment, the process can perform the illustrated actions in any order. In another embodiment, the process can omit one or more of the actions. In some embodiments, the process performs additional actions in conjunction with the process. In other embodiments, one of more of the actions are performed simultaneously.

The input devices for the drum system include a number of physical features.

Figure 24:
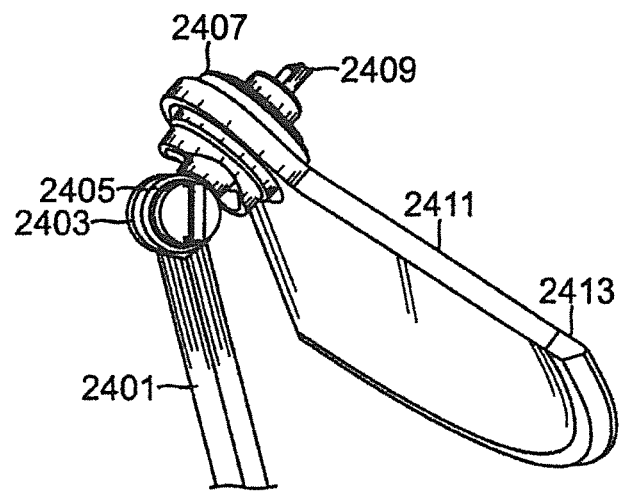
FIG. 24 is a rear perspective view of a cymbal of a drum system in accordance with aspects of the invention.

FIG. 24 is a rear perspective view of a cymbal structure of a drum system in accordance with aspects of the invention. The cymbal structure includes a vertical support 2401 having a first cylindrical joint 2403 at the upper end of the vertical support, a second cylindrical joint 2407, and a cymbal pad 2411. The first cylindrical joint 2403 allows rotation of the cymbal pad 2411 about an axis perpendicular to the vertical support 2401. The first cylindrical joint 2403 includes a first thumbscrew plug 2405 that operates similar to a wing nut except that the wing portion is attached to a bolt like shaft or plug rather than a nut. When the thumbscrew plug 2405 is tightened, it can fix the cymbal pad 2411 in a position such that it is prevented from rotating about the axis perpendicular to the vertical support 2401.

A shaft (not visible) extends from the first cylindrical joint 2403. The shaft has a second cylindrical joint 2407 at the end opposite to the first cylindrical joint. The second cylindrical joint 2407 includes a second thumbscrew plug 2409 that operates in a fashion similar to the first thumbscrew plug to prevent rotation about the axis of the shaft when the thumbscrew plug is tightened. The second cylindrical joint 2407 also directly supports and couples the cymbal pad 2411. The cymbal pad 2411 includes a sensor capable of detecting a strike to the cymbal by, for example, a drum stick. In one embodiment, the sensor is a piezoelectric sensor in a sheet like form. In some embodiments, the cymbal pad includes a top layer of rubber, a middle layer of acrylonitrile butadiene styrene (ABS) and a bottom layer of piezoelectric material. In such case, electrical leads are attached to the piezo material which can extend back to the drum system. In some embodiments, the piezo material is a thin film.

In some embodiments, an amplifier or pre-amplifier is used in conjunction with the piezoelectric sensor to detect a cymbal strike. In other embodiments, other sensors capable of detecting a cymbal strike can be used. The cymbal pad 2411 also includes a color outline portion 2413 at the perimeter of the rounded cymbal pad. The color outline 2413 displays a particular color, generally unique to the drum system components, that corresponds with the color of the notes displayed on the display screen for a game player during game play.

Figure 25:
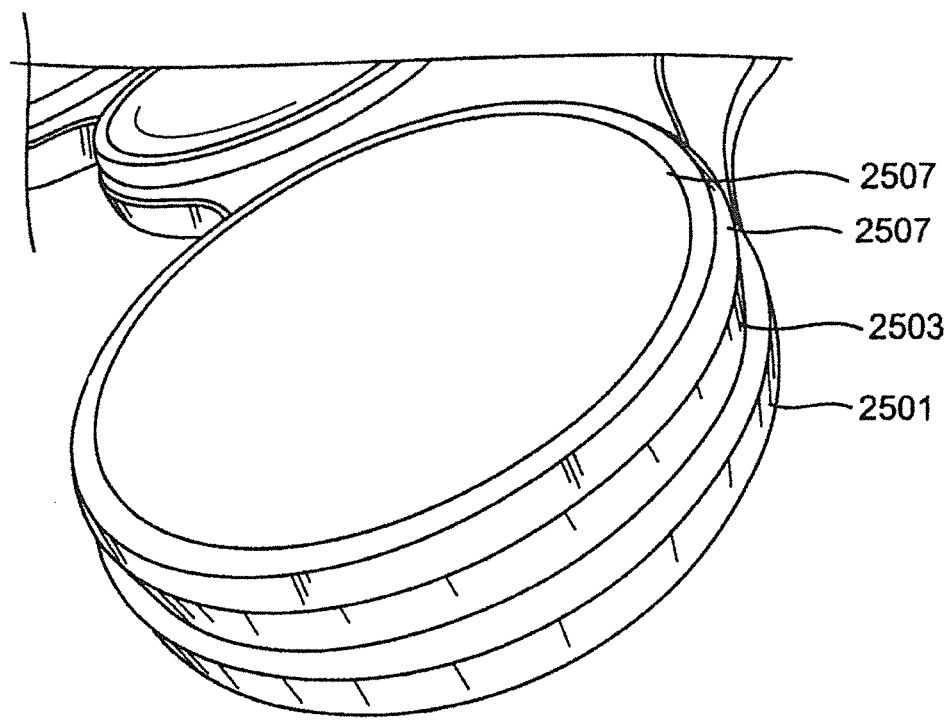
FIG. 25 is a perspective view of a low tom-tom drum of a drum system in accordance with aspects of the invention.

FIG. 25 is a perspective view of a low tom-tom drum of a drum system in accordance with aspects of the invention. The drum system includes a drum platform 2501 and the low tom-tom drum. The low tom-tom drum includes a partial drum enclosure 2503, a color band 2505, and a drum pad 2507. The low tom-tom drum pad 2507 includes a sensor capable of detecting a strike to the drum by, for example, a drum stick. In one embodiment, the sensor is a piezoelectric sensor in a sheet like form. In some embodiments, the drum pad includes top layer of rubber, a middle layer of ABS and a bottom layer of piezoelectric material acting as a sensor. In such case, electrical leads are attached to the piezo material which can extend back to the drum system.

In some embodiments, an amplifier or pre-amplifier is used in conjunction with the piezoelectric sensor to detect a drum strike. In other embodiments, other sensors capable of detecting a drum strike can be used. The drum pad 2507 also includes a color band 2505. The color band 2505 displays a particular color, generally unique to the drum system components, that corresponds with the color of notes displayed on the display screen during game play.

Figure 26:
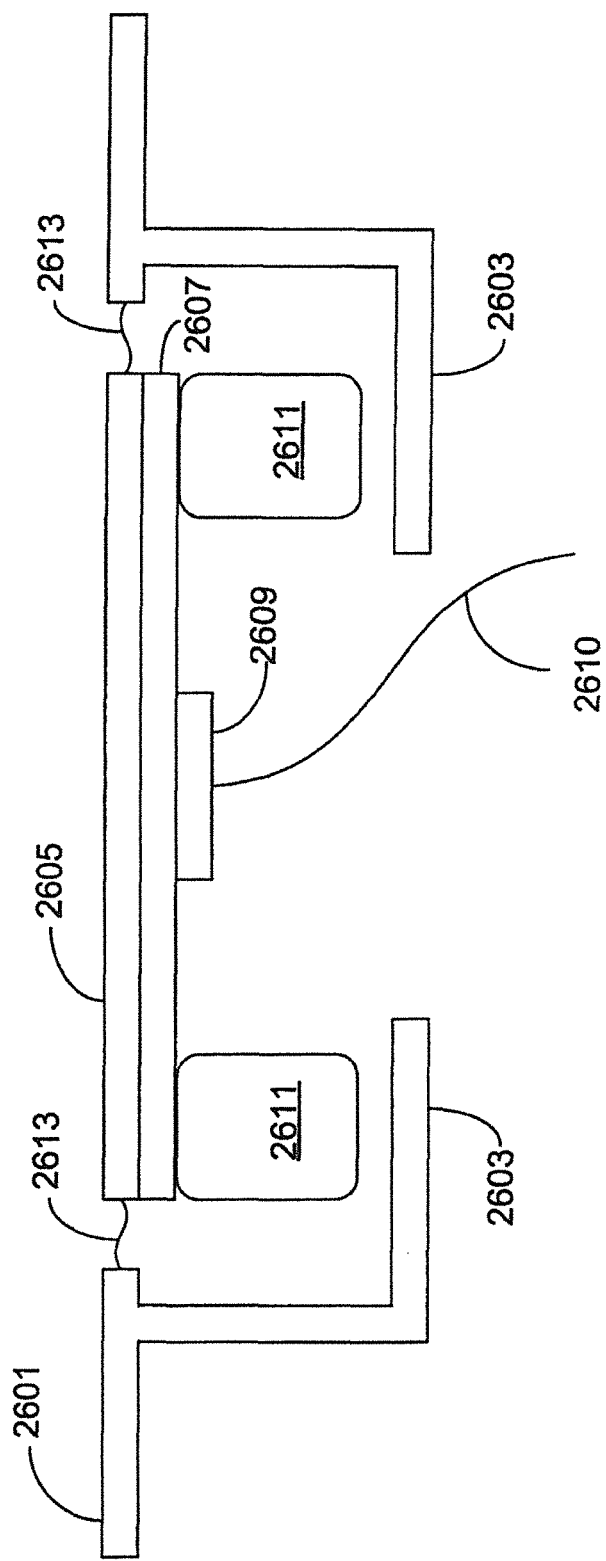
FIG. 26 is a cross sectional view of a drum for a drum system in accordance with aspects of the invention.

FIG. 26 is a cross sectional view of a drum for a drum system in accordance with aspects of the invention. The drum includes a cabinet 2601 (e.g. downward) that is coupled with a drum platform (not shown). The cabinet 2601 includes an L-shaped retainer 2603 that extends normal to the bottom of the cabinet 2601 and inward towards the center of the drum. The drum further includes a drum pad that has a gum rubber top layer 2605, an ABS layer 2607 coupled below the gum rubber layer 2605 and a piezoelectric sensor 2609. In some embodiments, the piezoelectric sensor 2609 is a piezoelectric film in a sheet form. In other embodiments, the piezoelectric sensor 2609 is a sensor comprised of piezo material in a form other than a sheet form. In one embodiment, the piezo material is a thin film adhered to the ABS insert using double side tape. The piezoelectric sensor 2609 is coupled to one or more wires 2610 that conduct electrical signals generated by the sensor.

The drum pad is supported by two foam supports 2611 that are attached to opposite ends of the bottom of the outermost areas of the ABS layer 2607. In a steady state or non-struck position of the drum, the foam supports 2611 do not contact the L-shaped retainer 2603. When the drum pad is struck, however, the foam supports 2611 may contact the L-shaped retainer and prevent overextension of the drum pad below the surface of the cabinet. In several embodiments, the foam supports have spring like character and bias the drum pad to a surface level. Two retainers 2613 are coupled to both an edge of the cabinet 2601 and the gum rubber layer 2605 of the drum pad to keep the drum pad aligned within the drum chamber formed by the cabinet and L-shaped retainer. In one embodiment, the separation between the edge of the cabinet and the drum pad is one eighth of one inch. In a number of embodiments, the drum cabinet does not form a sealed enclosure and instead provides a partially open bottom as illustrated in FIG. 26.

Figure 27:
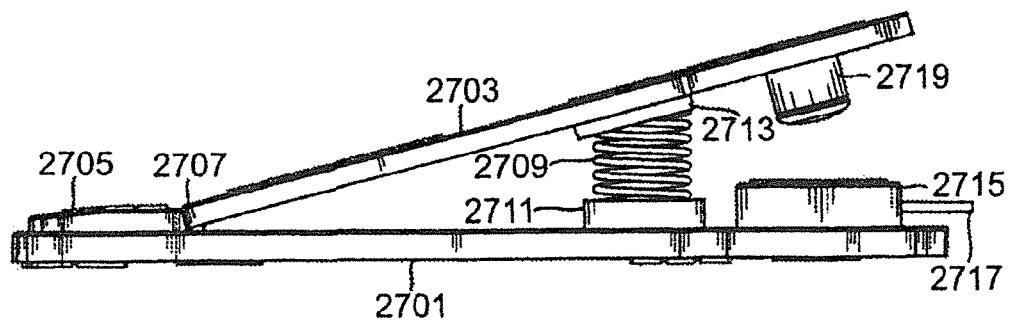
FIG. 27 is a side view of a kick drum pedal for a drum system in accordance with aspects of the invention.

FIG. 27 is a side view of a kick drum pedal for a drum system in accordance with aspects of the invention. The kick drum pedal includes a base plate 2701 for supporting the kick drum pedal on a flat surface such as a floor, a pedal plate 2703 for receiving pressure input from a game player, typically by way of the player's foot, a heel plate 2705 for supporting the game player's heel, a hinge 2707 for allowing rotation of the pedal plate 2703 about an axis of the hinge, and a coil spring 2709 for both resisting downward pressure from the game player and for biasing the foot pedal 2703 to a home position after pressure has been removed.

The base plate 2701 includes a lower spring retainer 2711 which has a cylindrical shape with an open top to receive a lower portion of the coil spring 2709. The pedal plate includes an upper spring retainer 2713 which has a cylindrical shape and an open bottom to receive an upper portion of the coil spring 2709. In other embodiments, the spring can take different shapes and the spring retainers can take other suitable shapes. In some embodiments, the spring can be replaced by another device resisting rotation of the pedal plate towards the base plate.

The base plate 2701 further includes a sensor assembly 2715 for sensing movement of the pedal plate 2703 and for providing one or more analog signals indicative of the degree of pressure applied to the pedal plate 2703. The sensor assembly 2715 provides the analog signals via a cable 2717 to the drum system (not shown). The sensor assembly 2715 is disposed on the top of the base plate and near an end opposite of the hinge 2707 and has a cylindrical shape. The pedal plate 2703 includes a actuating stop structure 2719 that protrudes from a bottom surface of the pedal plate at a location on the bottom surface that corresponds with the location of the sensor assembly 2715 on the base plate 2701 such that contact is made with the sensor assembly when the foot pedal is activated or compressed. The location of the actuating stop structure 2719 is generally near the end of the pedal plate 2703 opposite of the hinge 2707. In the illustrated embodiment, the actuating stop structure 2719 has a cylindrical shape where the diameter of the cylinder is less than a diameter of the cylindrical shape of the sensor assembly. In other embodiments, the sensor and actuating means can take different shapes.

In some embodiments, the bottom of the base plate includes one or more rubber feet that engage the floor and provide traction to avoid slipping. In one embodiment, the bottom of the base plate includes one or more Velcro pads that can provide traction on particular flooring surfaces such as carpet. In some embodiments, the top of the pedal plate includes one or more traction mechanisms. In one embodiment, the traction mechanisms can include plastic groves, traction pads, or adhesives. In some embodiments, the heel plate includes similar traction mechanisms.

Figure 28:
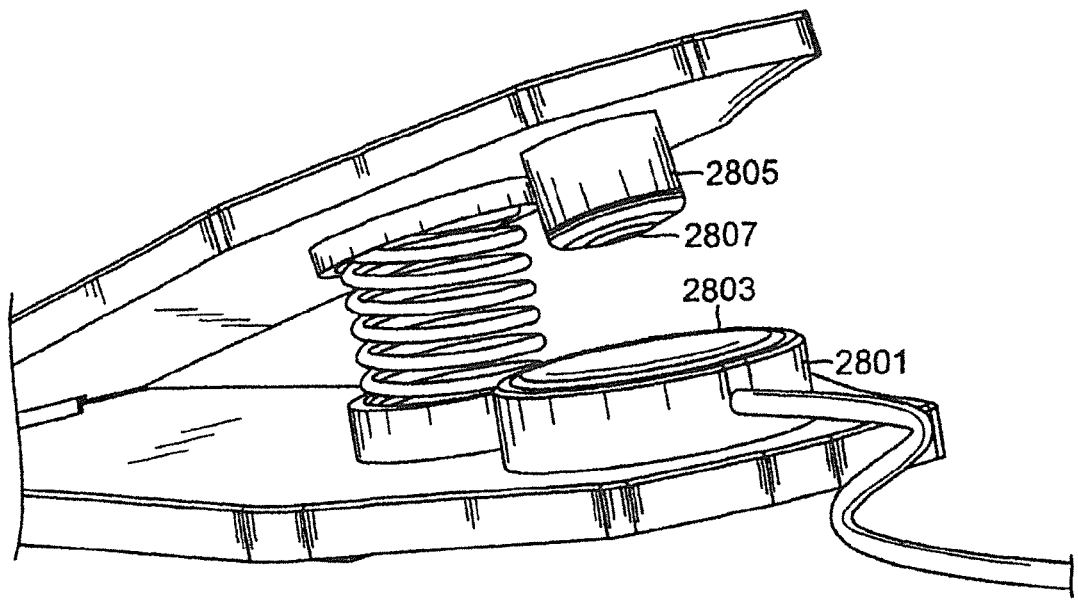
FIG. 28 is a perspective view of a portion of the kick drum pedal of FIG. 27 in accordance with aspects of the invention.

FIG. 28 is a perspective view of a portion of the kick drum pedal of FIG. 27 in accordance with aspects of the invention. The kick drum pedal includes a sensor assembly 2801 having a circular insert 2803 at the top of the cylindrical structure of the sensor assembly. In one embodiment, the circular insert 2803 of the sensor assembly 2801 is made of a rubber or soft rubber type material. The kick drum pedal also includes an actuating stop structure 2805 having a circular insert 2807 disposed at the bottom of the stop structure. In one embodiment, the circular insert 2807 of the stop structure 2805 is made of ABS or a similar plastic material.

Figure 29:
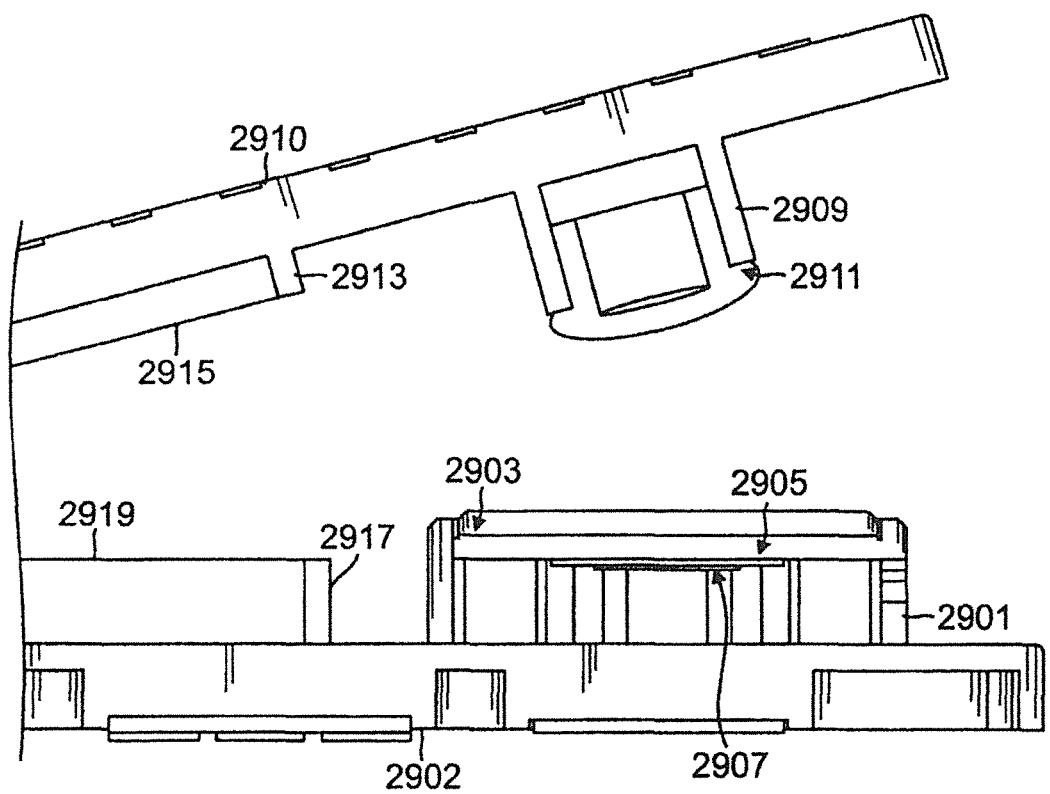
FIG. 29 is a cross sectional view of a portion of the kick drum pedal of FIG. 27 in accordance with aspects of the invention.

FIG. 29 is a cross sectional view of a portion of the kick drum pedal of FIG. 27 in accordance with aspects of the invention. The kick drum pedal includes a sensor assembly 2901 disposed on a top surface of the base plate 2902. The sensor assembly 2901 includes a top circular insert 2903, a middle circular insert 2905 and a piezo sensor 2907. In the illustrated embodiment, the sensor assembly 2901 also includes a cylindrical plastic body with an open top that surrounds the top circular insert 2903, the middle circular insert 2905 and the piezo sensor 2907. In one embodiment, the top circular insert 2903 is made of a rubber or soft rubber type material. In one embodiment, the middle circular insert is made of ABS or a similar plastic material. In several embodiments, the piezo sensor 2907 is made of a thin piezoelectric material in sheet form. In one embodiment, the film has a circular shape. In one embodiment, the piezo material is a thin film adhered to the ABS insert using double side tape. In a number of embodiments, the piezo sensor 2907 is coupled to one or more wires (not shown) that conduct electrical signals generated by the sensor using one or more electrodes coupled to the piezo sensor.

The kick drum pedal also includes an actuating stop structure 2909 disposed along the bottom surface of a pedal plate 2910. The stop structure 2909 includes a cylindrical plug like insert 2911 for making contact with the sensor assembly. In one embodiment, the insert 2911 of the stop structure 2909 is an ABS or other plastic material. In several embodiments, the stop structure is comprised of robust materials to withstand repeated contact with the sensor assembly. Similarly, the sensor assembly is comprised of robust materials to withstand repeated contact with the stop structure.

An upper spring retainer 2913 is also disposed along the bottom surface of the pedal plate 2910. The upper spring retainer 2913 has an open cylindrical shape for receiving a portion of a spring (not shown) at a bottom of the cylinder. The upper spring retainer 2913 includes a cylindrical recess 2915 for receiving the spring. A lower spring retainer 2917 is also disposed on the top surface of the base plate 2902. The spring retainer 2917 has an open cylindrical shape for receiving a portion of a spring (not shown). The lower spring retainer 2917 includes a cylindrical recess 2919 for receiving the spring.

In one embodiment, the piezo sensor includes a top electrode and a bottom electrode with piezo material disposed in between the top and bottom electrodes. When the piezo material is compressed electric signals can flow from one electrode to the other. The electric signals can flow at a rate proportional to, or at least dependent on, the amount of pressure applied to the piezo material. In several embodiments, the signals generated by the piezo sensor are analog signals indicative of a degree of compression or pressure applied to the sensor from a game player by way of the actuating stop structure 2909 and the pedal plate 2910. In other embodiments, other sensors can be used instead of the piezo sensor.

In one embodiment, a process executing on the game console changes the motion of a simulated drummer character on the display based on which drum or cymbal sensor pads are actuated. For example, for strikes of a single drum pad at a time, the process display the simulated drummer striking the hi-hat, hi-tom, lo-tom and crash cymbal with the right hand, while striking the snare with the left hand. In other embodiments, other assignments for hands to drums are possible. In one embodiment, the process provides a setting for either a right handed or a left handed player. In some embodiments, assignments for simulated drummer hand motion can change if two drums are instructed to be struck at the same time. For example, in one embodiment, the snare could be assigned to the left hand, the lo-tom to the right hand, crash cymbal to the right hand unless already in use, the hi-tom to the left hand unless already in use, and hi-hat to the right hand unless already in use. In other embodiments, other drum to hand assignments can be used. In some embodiments, the user can record and play back in real time to view the actions of the drummer.

The invention therefore provides a system and method for playing a music video game with a drum system game controller. Although the invention has been described with respect to certain embodiments, it should be recognized that the invention may be practiced other than as specifically described, the invention comprising the claims and their insubstantial variations supported by this disclosure.

What is claimed is:

1. A method of operating a video game console for providing a drum solo mode with a music based multi-player video game, the method comprising:
   displaying a suggestion of at least one song having a drum solo portion;
   displaying, on a display, images indicative of a venue including at least one drum and a drummer;
   displaying, on the display, instructions for playing the at least one song on a drum system game controller, the drum system game controller comprising a plurality of drum head shaped pads and sensors for detecting strikes to the pads;
   generating audio indicative of the song at a first volume;
   at approximately a time when the drum solo portion is to be played:
      changing the images indicative of the venue,
      generating audio indicative of the song at a second volume, where the second volume is lower than the first volume,
      generating audio indicative of a crowd cheering, and
      displaying images indicative of the crowd cheering;
   receiving information indicative of strikes to the pads of the drum system game controller;
   determining, based on the information indicative of strikes to the pads of the drum system game controller, a score; and
   displaying the score.

2. The method of claim 1, further comprising:
   at approximately the time when the drum solo portion is to be played:
      pausing the audio indicative of the song;
      dimming at least one light of the display;
      focusing a viewpoint of the display on the drummer;
      focusing at least one light of the display on the drummer; and
      returning the audio indicative of the song when a predetermined period of time for the solo has expired.

3. The method of claim 1, wherein the drum system controller further comprises two cymbal pads, the method further comprising enabling a score multiplier mode when the information indicative of drum play indicates that both cymbals pads were struck at approximately the same time.

4. The method of claim 1, further comprising entering the drum solo mode based on a predetermined characteristic comprising a sequence of drum strikes at a predetermined time during a song.

5. The method of claim 1, further comprising exiting the drum solo mode based on a sequence of drum strikes at a predetermined time during a song.

6. The method of claim 1, further comprising:
   commanding display of instructions for playing the drum solo portion; and
   generating audio not based on a user compliance with the instructions.

7. The method of claim 1, further comprising generating multiple sounds based on a single strike of a drum.

8. The method of claim 1, further comprising displaying a second drummer.

* * * * *